United States Patent
Yoon et al.

(10) Patent No.: US 10,516,820 B2
(45) Date of Patent: Dec. 24, 2019

(54) ELECTRONIC DEVICE FOR CONTROLLING FOCUS OF LENS AND METHOD FOR CONTROLLING THE SAME

(71) Applicant: SAMSUNG ELECTRONICS CO., LTD., Suwon-si, Gyeonggi-do (KR)

(72) Inventors: Kyung Hoon Yoon, Suwon-si (KR); Jae Hyoung Park, Seongnam-si (KR); Jeong Won Lee, Seongnam-si (KR); Han Sung Kim, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 23 days.

(21) Appl. No.: 15/997,968

(22) Filed: Jun. 5, 2018

(65) Prior Publication Data

US 2019/0028629 A1    Jan. 24, 2019

(30) Foreign Application Priority Data

Jul. 18, 2017 (KR) .................. 10-2017-0090894

(51) Int. Cl.
*H04N 5/232* (2006.01)
*H04N 5/235* (2006.01)
*H04N 17/00* (2006.01)

(52) U.S. Cl.
CPC ....... *H04N 5/23212* (2013.01); *H04N 5/2351* (2013.01); *H04N 5/23209* (2013.01); *H04N 17/002* (2013.01)

(58) Field of Classification Search
CPC .......... H04N 5/23212; H04N 5/23209; H04N 5/2351; H04N 17/002
See application file for complete search history.

(56) References Cited

U.S. PATENT DOCUMENTS

| 4,965,840 A | * | 10/1990 | Subbarao | ............... G01C 3/085 356/12 |
| 8,218,061 B2 | | 7/2012 | Baxansky | |

(Continued)

FOREIGN PATENT DOCUMENTS

| JP | 2010-107771 | 5/2010 |
| JP | 2011-107682 | 6/2011 |

(Continued)

OTHER PUBLICATIONS

Search Report and Written Opinion dated Sep. 18, 2018 in counterpart International Patent Application No. PCT/KR2018/006205.

*Primary Examiner* — Mekonnen D Dagnew
(74) *Attorney, Agent, or Firm* — Nixon & Vanderhye, P.C.

(57) ABSTRACT

An electronic device includes a camera and a processor. The processor is configured to: obtain a first image from the camera with respect to an external object, move a lens device depending on a specified amount of movement using a lens driver, obtain a second image corresponding to a position to which the lens device moves with respect to the external object, determine a first partial area of the first image corresponding to a specified portion of the external object, determine a second partial area of the second image corresponding to the first partial area based on the first partial area and the specified movement amount, determine a focus position with respect to the lens device based on a defocus difference between the first partial area and the second partial area and the specified movement amount, and move the lens device to the focus position using the lens driver.

20 Claims, 14 Drawing Sheets

(56) References Cited

U.S. PATENT DOCUMENTS

| | | |
|---|---|---|
| 8,675,121 B2 | 3/2014 | Yamasaki |
| 9,134,126 B2 | 9/2015 | Kimura |
| 9,264,606 B2 | 2/2016 | Ishihara |
| 9,413,952 B2 | 8/2016 | Komatsu |
| 9,576,370 B2 | 2/2017 | Komatsu et al. |
| 9,667,853 B2 | 5/2017 | Ogura et al. |
| 9,781,344 B2 | 10/2017 | Ishihara |
| 9,811,909 B2 | 11/2017 | Komatsu |
| 9,918,005 B2 | 3/2018 | Nakamaru et al. |
| 2010/0053417 A1 | 3/2010 | Baxansky |
| 2011/0164169 A1 | 7/2011 | Yamasaki |
| 2012/0140064 A1 | 6/2012 | Kimura |
| 2012/0237193 A1* | 9/2012 | Kawarada ................ G02B 7/34 396/95 |
| 2015/0042840 A1 | 2/2015 | Komatsu |
| 2015/0092091 A1 | 4/2015 | Ishihara |
| 2015/0138430 A1* | 5/2015 | Ogura .................. H04N 5/2328 348/349 |
| 2015/0235103 A1 | 8/2015 | Komatsu et al. |
| 2016/0127648 A1 | 5/2016 | Ishihara |
| 2016/0314591 A1 | 10/2016 | Komatsu |
| 2017/0366740 A1 | 12/2017 | Nakamaru et al. |

FOREIGN PATENT DOCUMENTS

| | | |
|---|---|---|
| JP | WO2011/158507 | 8/2013 |
| JP | 2015-036841 | 2/2015 |
| JP | 2015-072155 | 4/2015 |
| JP | 2015-152484 | 8/2015 |
| WO | 2016/158040 | 10/2016 |

* cited by examiner

ELECTRONIC DEVICE FOR CONTROLLING FOCUS OF LENS AND METHOD FOR CONTROLLING THE SAME

CROSS-REFERENCE TO RELATED APPLICATION

This application is based on and claims priority under 35 U.S.C. § 119 to Korean Patent Application No. 10-2017-0090894, filed on Jul. 18, 2017, in the Korean Intellectual Property Office, the disclosure of which is incorporated by reference herein its entirety.

BACKGROUND

1. Field

The present disclosure relates to a technology for controlling a focus and/or for obtaining distance information of an electronic device including a camera.

2. Description of Related Art

A camera module includes a driver to move a plurality of lenses (lens devices) and performs an auto focus (AF) operation while moving the lenses by the driver.

The camera module performs the auto focusing operation using a contrast AF method, a phase difference AF method, or a depth from defocus (DFD) AF method.

The above information is presented as background information only to assist with an understanding of the present disclosure. No determination has been made, and no assertion is made, as to whether any of the above might be applicable as prior art with regard to the present disclosure.

SUMMARY

According to the conventional contrast AF method, the camera module performs a shooting operation while changing a lens position, obtains contrast for an image acquired from an image sensor, and adjusts a focus by controlling the lens to a peak position of the contrast. Since the contrast AF method is a method that finds a focus position based on the contrast, the direction of movement of the lens is not determined. Accordingly, the focusing speed becomes slow.

According to the conventional phase difference AF method, the camera module includes a sensing device separated from the image sensor and detects the focus position using a phase difference between lights traveling to the sensing device. Since the camera module of the phase difference AF method determines the direction of movement of the lens based on the phase difference, the focusing speed is relatively fast. However, since the camera module of the phase difference AF method requires a mirror, the camera module has a large size, and a focus detection is difficult to perform during continuous shooting. In addition, the phase difference AF method of mirrorless camera has been released recently, and the phase difference AF method of mirrorless camera detects the focus position using the image sensor after converting a portion of the image sensor to a phase difference pixel or using the phase difference of the image imaged by dividing a light receiving portion of the pixel. However, the phase difference AF method of mirrorless camera exerts a bad influence on an image quality or causes an increase in cost.

According to the DFD AF method, the camera module identifies the focus position of the lens by obtaining two images from different lens positions from each other and identifying a point spread function corresponding to a difference in defocus size between the two images through a DFD calculation. However, in the DFD AF method, an error occurs in the result of the DFD calculation due to the difference in angle of view, which is caused by the lens movement.

Aspects of the present disclosure address at least the above-mentioned problems and/or disadvantages and to provide at least the advantages described below. Accordingly, an aspect of the present disclosure is to provide an electronic device for controlling a focus of lens and a method for controlling the electronic device, which is capable of correcting coordinate deviations depending on a view angle variation by lens position.

In accordance with an aspect of the present disclosure, an electronic device includes a camera and a processor. The camera includes a lens device comprising at least one lens and a lens driver that moves the lens device. The lens device is provided such that a difference occurs between a first viewing angle when the lens device is located at a first position and a second viewing angle when the lens device is located at a second position or between a first magnification when the lens device is located at the first position and a second magnification when the lens device is located at the second position in at least some sections. The processor is configured to obtain a first image from the camera with respect to an external object, to move the lens device depending on a specified movement amount using the lens driver, to obtain a second image corresponding to a position to which the lens device moves with respect to the external object, to determine a first partial area of the first image corresponding to a specified portion of the external object, to determine a second partial area of the second image corresponding to the first partial area based on the first partial area and the specified movement amount, to determine a focus position with respect to the lens device based on a defocus difference between the first partial area and the second partial area and the specified movement amount, and to move the lens device to the focus position using the lens driver.

In accordance with another aspect of the present disclosure, a method of controlling an electronic device includes obtaining a first image from a camera with respect to an external object, moving a lens device comprising at least one lens depending on a specified movement amount using a lens driver, obtaining a second image corresponding to a position to which the lens device moves with respect to the external object, determining a first partial area of the first image corresponding to a specified portion of the external object, determining a second partial area of the second image corresponding to the first partial area based on the first partial area and the specified movement amount, determining a focus position with respect to the lens device based on a defocus difference between the first partial area and the second partial area and the specified movement amount, and moving the lens device to the focus position using the lens driver.

According to various example embodiments disclosed in the present disclosure, coordinate deviations due to a viewing angle variation caused by the movement of the lens may be corrected.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, it should be noted that like reference numbers are used to depict the same or similar elements, features, and structures.

DETAILED DESCRIPTION

Figure 1:
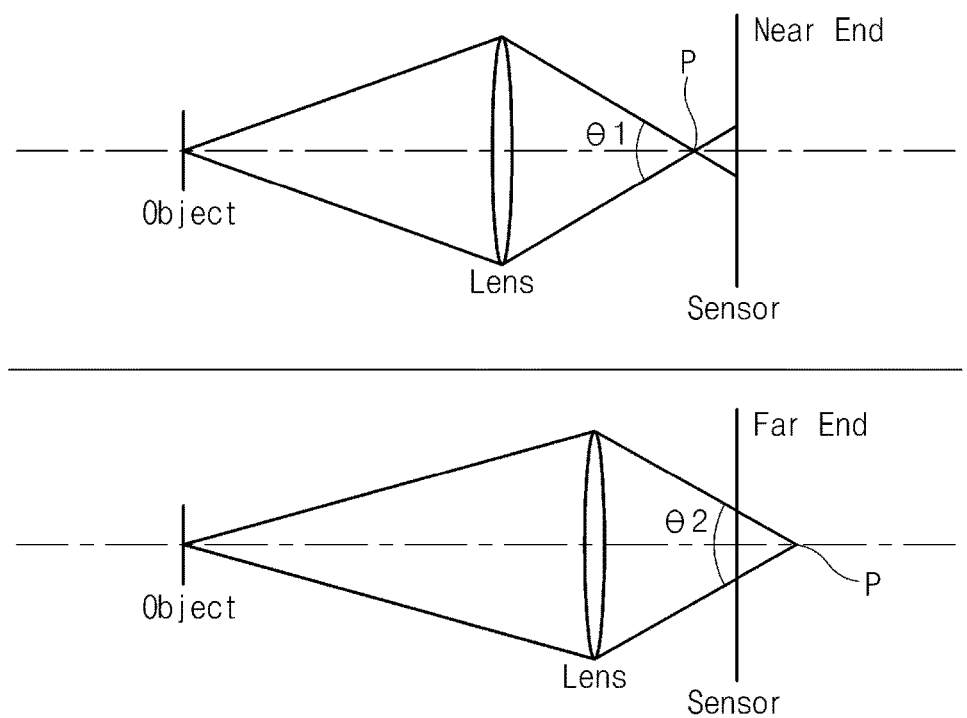
FIG. 1 is a diagram illustrating an example focus position variation due to lens movement according to an embodiment.

Hereinafter, various example embodiments of the present disclosure may be described with reference to accompanying drawings. Accordingly, those of ordinary skill in the art will recognize that modifications, equivalents, and/or alternatives of the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may be used to refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of" "designed to", or "adapted to". Under a certain situation, the expression "a device configured to" may refer, for example, to a situation in which the device is "capable of" operating together with another device or other components. For example, a "processor configured to (or adapted to) perform A, B, and C" may refer, for example, and without limitation, a dedicated processor (e.g., an embedded processor) for performing a corresponding operation, a generic-purpose processor (e.g., a central processing unit (CPU) or an application processor), or the like which may perform corresponding operations by executing one or more software programs which are stored in a memory device.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, and/or a wearable device, or the like, but is not limited thereto. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), and/or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, and/or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, and/or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, and/or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in greater detail with reference to the accompanying drawings. The term "user" used herein may refer to a person who uses an electronic device or may refer to a device (e.g., an artificial intelligence electronic device) that uses an electronic device.

FIG. 1 is a diagram illustrating an example focus position variation due to lens movement according to an embodiment.

Referring to FIG. 1, a focus position "p" of a lens device "lens" (e.g., a lens device 610 of FIG. 6) with respect to an external object "object" located at a designated distance may be changed depending on a present position of the lens device "lens". As an example, the focus position "p" of the lens device "lens" may be located in front "Near End" of an image sensor "sensor" when the lens device "lens" is located at a position relatively near to the external object "object" (or a position relatively far from the image sensor "sensor") with respect to a location of the image sensor "sensor". The focus position "p" of the lens device "lens" may be located behind "Far End" the image sensor "sensor" when the lens device "lens" is located at the position relatively far from the external object "object" (or the position relatively near to the image sensor "sensor") with respect to the location of the image sensor "sensor".

According to an embodiment, a defocus size of the image imaged on the image sensor "sensor" may be changed depending on the position of the lens device "lens" or a distance between the lens device "lens" and the image sensor "sensor". The defocus size may, for example, be the smallest when the focus position "p" is located on the image plane of the image sensor "sensor", and may increase as the focus position "p" is spaced apart from the image plane of the image sensor "sensor".

According to an embodiment, the position of the lens device "lens" may exert an influence on viewing angles θ1 and θ2 of the image sensor "sensor". For example, the viewing angle θ1 of the image sensor "sensor" when the lens device "lens" approaches the external object "object" may be smaller than the viewing angle θ2 of the image sensor "sensor" when the lens device "lens" moves away from the external object "object".

Figure 2:
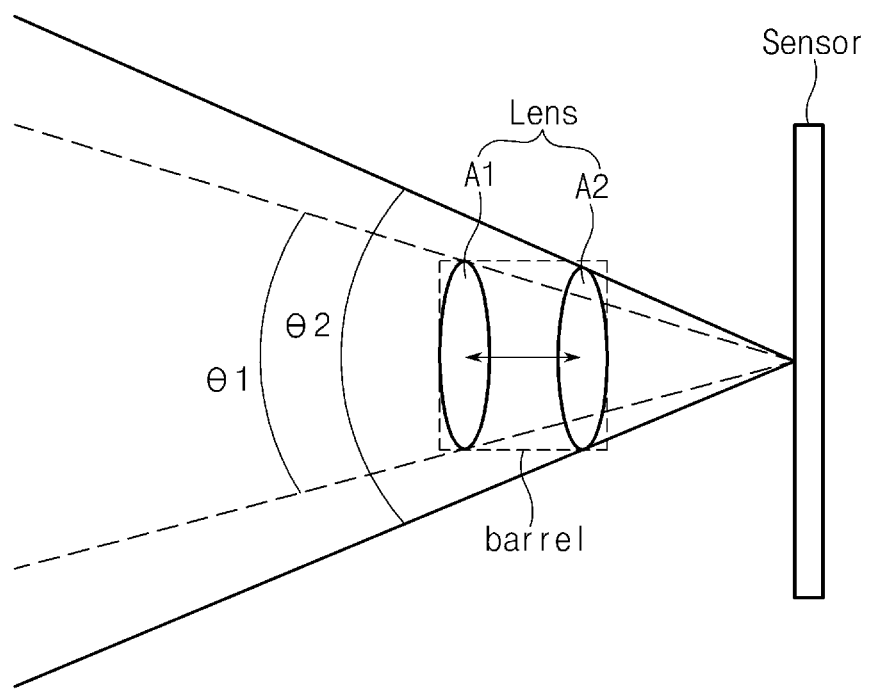
FIG. 2 is a diagram illustrating a viewing angle variation due to lens movement according to an embodiment.

FIG. 2 is a diagram illustrating a viewing angle variation due to lens movement according to an embodiment.

Referring to FIG. 2, the lens device "lens" may move forward and backward in a predetermined area (e.g., inside a barrel) "barrel". The focus position of the lens device "lens" may be located at a first position A1 relatively near to the external object (e.g., "object" of FIG. 1) when the external object "object" relatively approaches the lens device "lens" and may be located at a second position A2 relatively far from the external object "object" when the external object "object" is relatively separated from the lens device "lens".

According to the viewing angle of the image sensor "sensor", a first viewing angle θ1 obtained when the lens device "lens" is located at the first position A1 near to the external object "object" may be smaller than a second viewing angle θ2 obtained when the lens device "lens" is located at the second position A2 spaced apart from the external object "object".

Figure 3:
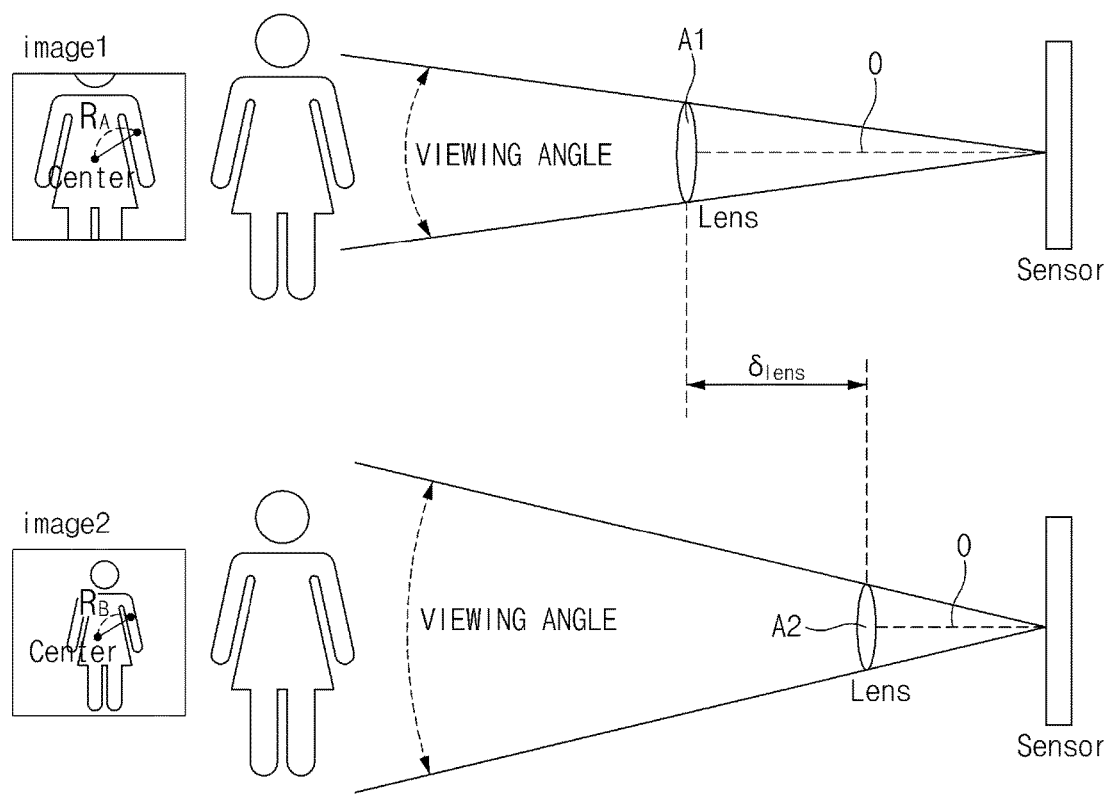
FIG. 3 is a diagram illustrating an error in DFD calculation due to the viewing angle variation according to an embodiment.

FIG. 3 is a diagram illustrating an error in a depth from defocus (DFD) calculation due to the viewing angle variation according to an embodiment.

Referring to FIG. 3, a camera module (e.g., a camera module 60 of FIG. 6) may calculate (determine) the focus position using the DFD calculation. As an example, the camera module 60 (refer to FIG. 6) may obtain a first image image1 at the first position A1 of the lens device "lens", move the lens device "lens" by a specified movement amount $\delta_{lens}$, and obtain a second image image2 at the second position A2 of the lens device "lens". The camera module 710 (see, e.g., FIG. 7) may determine a region of interest of the first image and the second image and perform the DFD calculation based on a difference in defocus between the regions of interest of the first and second images while moving the lens device "lens" by the specified movement amount using specified point spread functions to calculate the focus position of the lens device "lens". The specified point spread functions may be modeled to correspond to lens characteristics of the camera module 710.

The camera module 60 (refer to FIG. 6) may select two point spread functions having a distance corresponding to the specified movement amount $\delta_{lens}$ among the specified point spread functions when performing the DFD calculation and calculate a cost value Cost(d) by substituting the selected two point spread functions K(d) and K(d+δ), a characteristic F1 of the first image, and a characteristic F2 of the second image into the following Equation 1. The characteristic F1 of the first image and the characteristic F2 of the second image may be, for example, defocusing characteristics of the regions of interest of the first and second images. The camera module 710 may calculate a defocus distance (or the defocus position) between the two point spread functions that minimizes the calculated cost value as the defocus distance of the lens device "lens".

$$\text{Cost}(d) = \sum_{band} \left( \frac{|F_2 K(d) - F_1 K(d+\delta)|^2}{|K(d)|^2 + |K(d+\delta)|^2} \right) \quad \text{Equation 1}$$

In Equation 1, the characteristic F1 of the first image may correspond to a real number value obtained by converting a pixel value of the first image to a frequency domain, and the characteristic F2 of the second image may correspond to a real number value obtained by converting a pixel value of the second image to a frequency domain.

According to an embodiment, since the first image "image1" and the second image "image2" are obtained from different lens positions from each other, there is a difference in viewing angle between the first image "image1" and the second image "image2", and thus the first image "image1" and the second image "image2" may have different magnifications and different viewing angles from each other. The difference of the viewing angle may lead to coordinate deviations. When considering the coordinate deviations, the cost value determined by the DFD calculation may have an error ε represented by the following Equation 2. The error ε may occur due to the difference in viewing angle between the first image and the second image when comparing relatively different images in the same region of interest of the first image and second image.

$$\text{Cost}(d) = \sum_{band} \frac{|(F_2 + \varepsilon)K(d) - F_1 K(d+\delta)|^2}{|K(d)|^2 + |K(d+\delta)|^2} \quad \text{Equation 2}$$

As described above, the viewing angle variation of the camera module 60 (refer to FIG. 6) may cause the error on the focus position determined by the DFD calculation.

Figure 4:
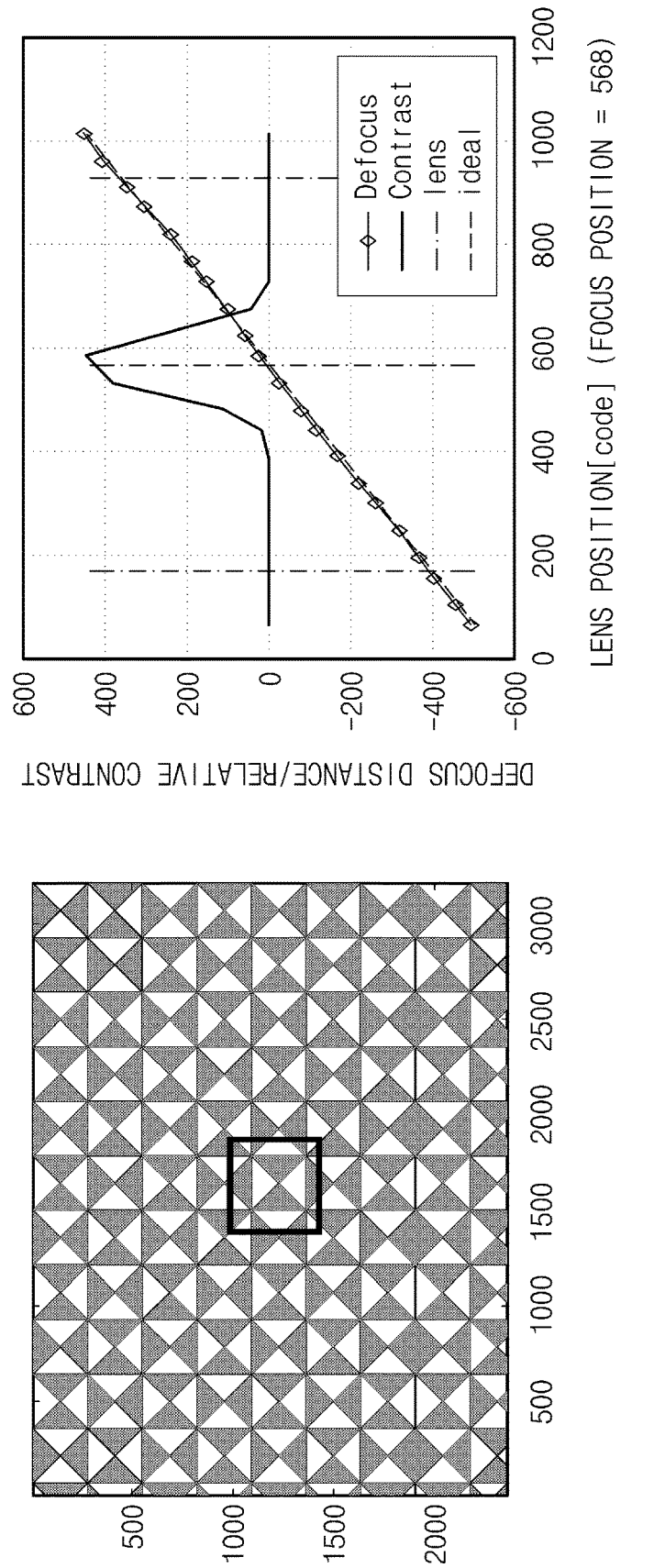
FIG. 4 is a graph illustrating the error in DFD calculation due to the viewing angle when a center area of an image is used for DFD calculation according to an embodiment.

FIG. 4 is a graph illustrating the error in DFD calculation due to the viewing angle when a center area of an image is used for the DFD calculation according to an embodiment. In FIG. 4, a solid line graph "defocus" with circle markers may indicate a distance from an on-focus, which is calculated by the DFD calculation, at each lens position. A solid line graph "contrast" may indicate a relative contrast of the image, and a peak of the solid line may be the focus position. A dashed line graph "ideal" shows an ideal defocus position in which the variation of the defocus size depending on unit position movement of the lens is constant. In addition, vertical dot-dash lines "lens position" may indicate the lens position of the lens device (e.g., lens device "lens"). A rightmost dashed line may be the lens position "Near End" nearest to the external object, an intermediate dashed line may be the focus position of the lens, and a leftmost dashed line may be the lens position "Far End" farthest from the external object.

Referring to FIG. 4, the coordinate deviations due to the viewing angle variation may be relatively small in the center area of the image. Accordingly, when the region of interest corresponds to the center area, the error, which is caused by the viewing angle variation, of the focus position calculated by the DFD calculation may be relatively small.

Figure 5:
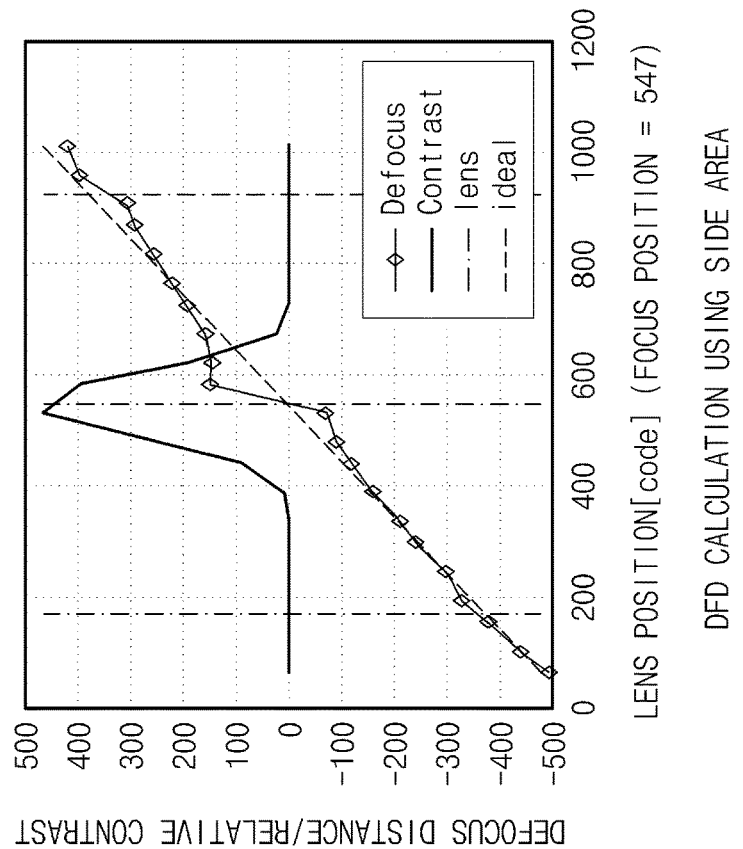
FIG. 5 is a graph illustrating the error in DFD calculation due to the viewing angle when a side area of an image is used for DFD calculation according to an embodiment.
Figure 5:
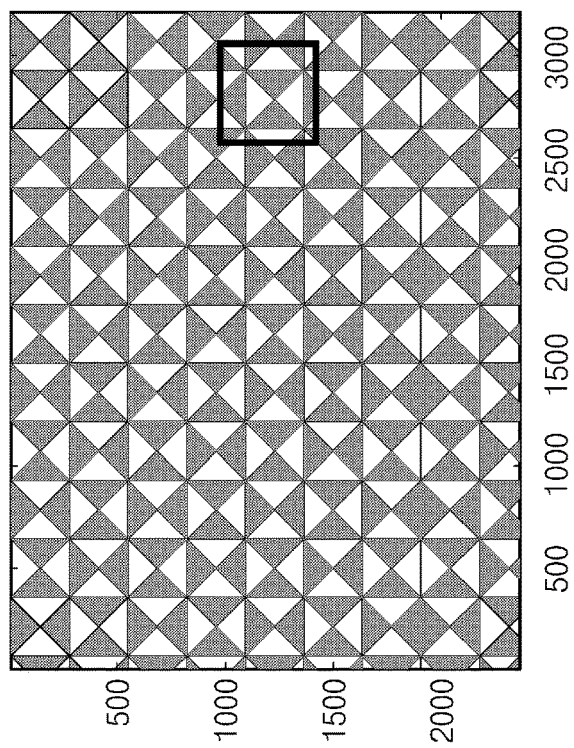

FIG. 5 is a graph illustrating the error in the DFD calculation due to the viewing angle when a side area of an image is used for the DFD calculation according to an embodiment. In FIG. 5, a solid line graph "defocus" with circle markers may indicate a defocus position calculated by the DFD calculation at each lens position. A solid line graph "contrast" may indicate a relative contrast of the image, and a peak of the solid line may be the focus position. A dashed line graph "ideal" shows an ideal defocus position in which the variation of the defocus size depending on unit position movement of the lens is constant. In addition, vertical dot-dash lines "lens" may indicate the lens position of the camera module 710. A rightmost dashed line may be the lens position "Near End" nearest to the external object, an intermediate dashed line may be the focus position of the lens, and a leftmost dashed line may be the lens position "Far End" farthest from the external object.

Referring to FIG. 5, the coordinate deviations due to the viewing angle variation may be relatively large in the side area of the image. Accordingly, when the region of interest corresponds to the center area, the coordinate deviations occur in the region of interest between the first image and the second image, which are obtained from different lens positions from each other, due to the viewing angle variation, and the error, which is caused by the viewing angle variation, of the focus position calculated by the DFD calculation may be relatively large.

Figure 6:
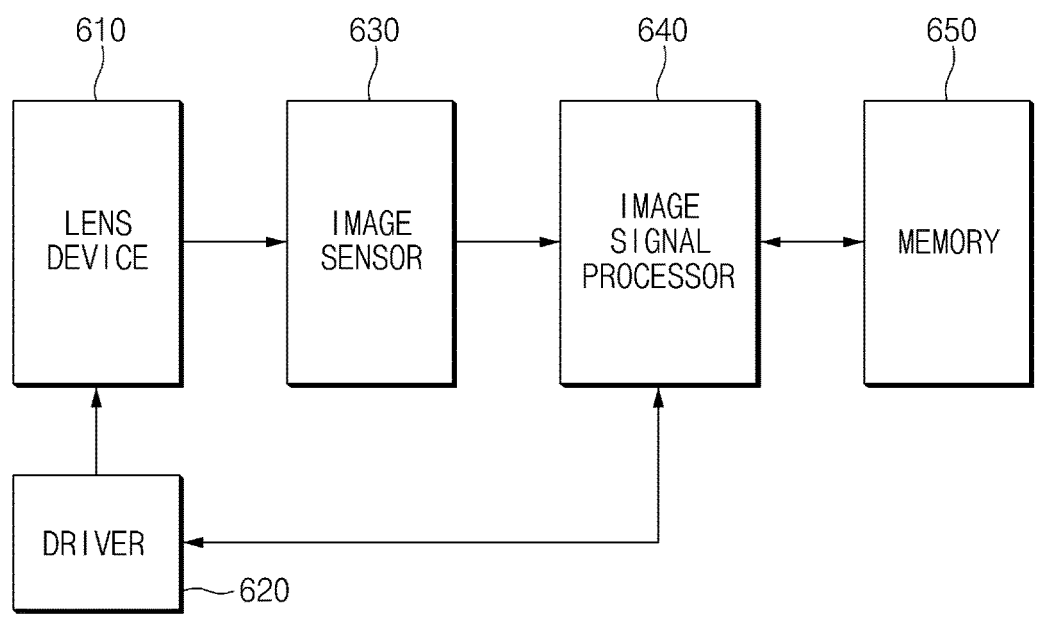
FIG. 6 is a block diagram illustrating a camera module according to an embodiment.

FIG. 6 is a block diagram illustrating the camera module 60 according to an embodiment.

According to an embodiment, the camera module 60 may include a lens device (e.g., including at least one lens) 610, a driver (e.g., including driving circuitry) 620, an image sensor 630, an image signal processor (e.g., including image processing circuitry) 640, and a memory 650.

According to an embodiment, the lens device 610 (e.g., 1410) may include, for example, and without limitation, at least one lens. For instance, the lens device 610 may include a plurality of lenses. The lens device 610 may include, for example, and without limitation, a group of lenses spaced apart from each other at regular intervals and fixed to the barrel. The lens device 610 may move along an optical axis 0 with the barrel when receiving a force from the driver 620. The optical axis may be a center of the lens device 610. As an example, the lens device 610 may move in a first direction approaching the external object or in a second direction away from the external object depending on a direction of the force applied by the driver 620. The first direction and the second direction may be different directions from each other on the same axis (e.g., optical axis). The external object may be at least a portion of a subject.

According to an embodiment, in the lens device 610, there may be a difference between the first viewing angle when the lens device 610 is located at the first position and the second viewing angle when the lens device 610 is located at the second position in at least some sections. For example, the first viewing angle of the image sensor 630 when the lens device 610 is located at the first position may be different from the second viewing angle of the image sensor 630 when the lens device 610 is located at the second position.

According to an embodiment, the image sensor 630 (e.g., 1430) may include various circuitry to convert a light passing through the lens device 610 to an electrical signal and output the electrical signal as an image signal. The image sensor 630 may be, for example, and without limitation, a charge coupled device (CCD), a complementary metal oxide semiconductor (CMOS), or the like. The image signal may correspond to the image received on the image sensor 630.

According to an embodiment, the driver 620 (e.g., 1440) may include various driving circuitry to move the lens device 610 along the optical axis in response to instructions from the image signal processor 640. For example, the driver 620 may move the lens device 610 along the optical axis in the first direction or the second direction by the movement amount in response to instructions from the image signal processor 640.

The driver 620 may move the lens device 610 by a unit interval in a total distance in which the lens device 610 moves along the optical axis for focus adjustment. The unit interval may, for example, and without limitation, include unit intervals obtained by dividing the total distance into $1024(=2^{10})$ or $512(=2^9)$ intervals. At least some intervals among the unit intervals may be same as each other, and some other intervals among the unit intervals may be different from each other.

The memory 650 may, for example, and without limitation, be a volatile memory (e.g., RAM, etc.), a nonvolatile memory (e.g., ROM, flash memory, etc.), and/or a combination thereof. The memory 650 may store, for example, instructions or data related to at least one other component of the camera module 60.

According to an embodiment, the memory 650 (e.g., 1450 of FIG. 14) may store a specified point spread function. As an example, the point spread function may include a plurality of point spread degrees modeled to correspond to the defocus size of a point light source (unsaturated) spaced apart from the image sensor 630 by a predetermined distance at each position at which the lens device 610 may move. As another example, the point spread function may include point spread degrees modeled using Equation 1 based on design data of the lens device 610 to correspond to the defocus size of a point light source spaced apart from the image sensor 630 by a predetermined distance at each position at which the lens device 610 may move.

According to an embodiment, the memory 650 may store instructions to extract areas used for the DFD calculation from the image obtained from the image sensor 630. As an example, the memory 650 may store at least one of the specified movement amount, the first position, or the second position, which is used to control the position by the driver 620. As another example, the memory 650 may store instructions to determine a second partial area of the second image corresponding to a first partial area of the first image.

According to an embodiment, the image signal processor 640 (e.g., 1460 of FIG. 14) may include various image signal processing circuitry and obtain the first image with respect to the external object from the image sensor 630 at the first position of the lens device 610. The image signal processor 640 may apply a signal corresponding to the specified movement amount to the driver 620 to move the lens device 610 to the second position from the first position. The image signal processor 640 may obtain the second image with respect to the external object, which corresponds to the second position of the lens device 610. The first image and the second image may be, for example, images having a difference in the position of the lens device 610 without having variations in the distance and position of the external object based on the camera module 60. The second image may be, for example, an image taken with a slightly-changed magnification from the first image to have a different image size of the external object.

According to an embodiment, the image signal processor 640 may determine the first partial area (e.g., a region of interest (ROI) area of the first image) from the first image corresponding to a specified portion of the external object. The specified portion may include, for example, at least one of a center area of the first image, a face recognition area of the first image, or an area designated by a user in the first image.

According to an embodiment, the image signal processor 640 may determine the second partial area (e.g., a region of interest (ROI) area of the second image) from the second image corresponding to the first partial area and the specified movement amount. For example, the image signal processor 640 may determine a second distance (e.g., $R_B$ of FIG. 3) between a center of the second image and a center of the second partial area by substituting a first distance (e.g., $R_A$ of FIG. 3) between a center of the first image and a center of the first partial area, a distance variation coefficient, and the specified movement amount $\delta_{lens}$ into the following Equation 3.

$$R_B = (1+\alpha\delta_{lens})R_A \qquad \text{Equation 3}$$

In Equation 3, $\alpha$ denotes the distance variation coefficient that may be determined through experiments to identify how far a pixel (e.g., an edge pixel of the entire image), which is spaced apart from the center of the image, is from the center of the image along the unit movement of the lens device 610. As another way, the distance variation coefficient may be determined based on the design data of the lens.

According to an embodiment, the image signal processor 640 may determine a center coordinate of the second partial area using a relation between the determined first distance and the calculated second distance. When the determined center coordinate of the second partial area is not an integer number, the image signal processor 640 may determine the center coordinate of the second partial area by rounding off or discarding a decimal point of the determined center coordinate of the second partial area.

According to an embodiment, the image signal processor 640 may detect the second partial area including a first specified number of horizontal pixels and a second specified number of vertical pixels with respect to the center coordinate determined from the second image. The first specified number may correspond to, for example, the number of horizontal pixels of the first partial area. The second specified number may correspond to, for example, the number of vertical pixels of the first partial area. The image signal processor 640 may correct a coordinate error caused by the viewing angle variation of the lens when detecting the first partial area and the second partial area, and thus the error in the DFD calculation, which caused by the viewing angle variation, may be improved.

According to an embodiment, the image signal processor 640 may correct an average brightness with respect to the determined first partial area and the second partial area. For example, the image signal processor 640 may calculate an average brightness of pixels included in the first partial area and an average brightness of pixels included in the second partial area. The image signal processor 640 may determine a value obtained by multiplying each pixel value of the second partial area by a ratio of the average brightness of the first partial area to the average brightness of the second partial area using the following Equation 4 as a pixel value of the second partial area.

Corrected pixel value of second partial area=(original pixel value of second partial area)×(average brightness of first partial area)/(average brightness of second partial area)   Equation 4

According to an embodiment, the image signal processor 640 may perform the DFD calculation using the first partial area and the second partial area, which have the same or similar average brightness as each other, and thus the error in the result of the DFD calculation, which is caused by the variation of the defocus size due to the brightness difference of the images, may be improved.

According to an embodiment, the image signal processor 640 may determine the first and second images or the first and second partial areas by taking into account a mounting deviation of at least some components of the camera module 60. In case of an ideal camera module 60, a crossing point between the optical axis of the lens device 610 and the image plane may be located at a center of the image plane, and the optical axis of the lens device 610 may be vertical to the image plane. The image plane may be, for example, a surface where the image (e.g., the first or second image) is imaged on the image sensor 630, and the image plane may have a size corresponding to a size of the first or the second image.

According to an embodiment, the center of the image plane (e.g., the first image) may be center-shifted from the crossing point between the optical axis of the lens device 610 and the image plane due to the mounting deviation of the camera module 60. In this case, the image signal processor 640 may correct the crossing point between the optical axis of the lens device 610 and the image plane to the center of the first image and determine the first partial area and the second partial area based on the corrected center. A difference between the center of the image plane and the center of the optical axis or the position of the center of the optical axis on the image plane may be determined by experiments in manufacturing process of the camera module 60 and stored in the memory 650. As an example, the image signal processor 640 may determine the first distance $R_A$ between the corrected center and the center of the first partial area and determine the second distance $R_B$ based on the determined first distance. The image signal processor 640 according to an embodiment may prevent the error from occurring in the DFD calculation due to the center shift of the image plane.

According to an embodiment, the optical axis of the lens device 610 may not be vertical to the image plane due to the mounting deviation of the camera module 60. In this case, the image signal processor 640 may determine the first partial area and the second partial area to correct the tilting of the image plane. The tilting of the image plane may be determined by an experiment in the manufacturing process of the camera module 60. As an example, when obtaining the first and second images from the image sensor 630, the image signal processor 640 may correct the tilting of the obtained first and second images using a specified position conversion function and determine the first partial area and the second partial area using the corrected first and second images. The specified position conversion function may be determined to correct the tilting of the image plane and stored in the memory 650. The image signal processor 640 according to an embodiment may prevent the error from occurring in the DFD calculation due to the tilting of the image plane.

According to an embodiment, the image signal processor 640 may determine the focus position with respect to the lens device 610 based on the difference between the first partial area and the second partial area and the specified movement amount. For example, the image signal processor 640 may select plural pairs of two point spread degrees having the distance corresponding to the specified movement amount among the specified point spread degrees from the memory 650 and detect two point spread degrees corresponding to the defocus size of the first and second partial areas among the selected plural pairs of two point spread degrees, thereby determining the focus position of the lens device 610 with respect to the external object.

Figure 7:
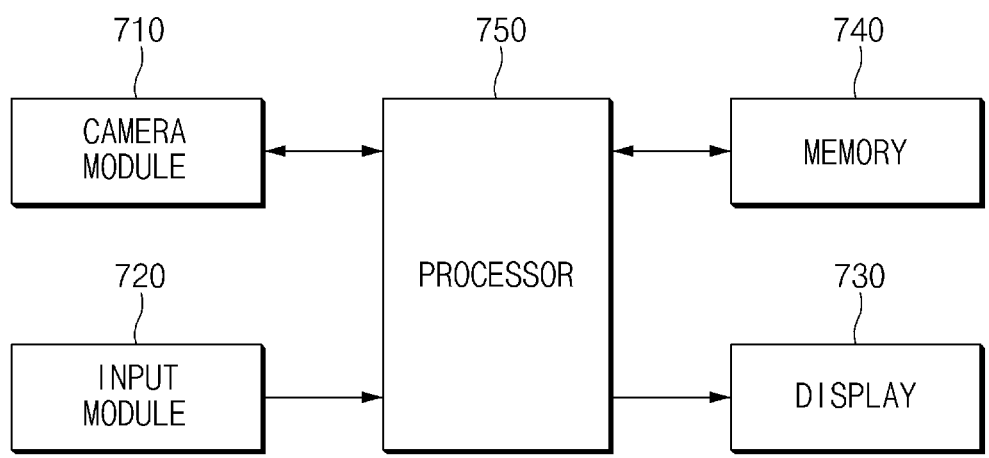
FIG. 7 is a block diagram illustrating an electronic device according to an embodiment.

FIG. 7 is a block diagram illustrating an electronic device 70 according to an embodiment.

Referring to FIGS. 6 and 7, according to an embodiment, the electronic device 70 may include the camera module (e.g., including a camera) 710, a display 730, an input module (e.g., including input circuitry) 720, a memory 740, and a processor (e.g., including processing circuitry) 750. According to various embodiments, some elements may be omitted or other additional elements may be added. According to various embodiments, some of the elements may be combined with each other to form one entity, however the functions of the elements may be performed in the same manner as before the combination. An input/output relation shown in FIG. 7 is merely an example for the convenience of explanation and should not be limited thereto or thereby. In FIG. 7, the processor 750, which performs at least some functions of the camera module 710, will be described as a representative example.

According to an embodiment, the camera module 710 may include the image sensor 630, the driver 620, and the lens device 610 as shown in FIG. 6. The lens device 610 may include the group of lenses and move the group of lenses along the optical axis to focus. As an example, the driver 620 may receive a control signal from the processor 750 and move the position of the lens device 610 in the first direction approaching the external object or in the second direction away from the external object by the movement amount corresponding to the control signal. In the lens device 610, the difference in viewing angle may occur between the first viewing angle when the lens device 610 is located at the first position and the second viewing angle when the lens device 610 is located at the second position in at least some sections. As another example, in the lens device 610, there is a difference between a first magnification when the lens device 610 is located at the first position and a second magnification when the lens device 610 is located at the second position.

According to an embodiment, the camera module 710 may transmit a preview image of the image imaged on the image sensor 630 to the display 730. The camera module 710 may transmit the image taken by the image sensor 630 to the processor 750. In an embodiment, the camera module 710 may transmit a plurality of preview images obtained from a plurality of lens positions at a specified time point to the processor 750. The specified time point may be, for example, a time point at which the camera module 710 performs the focus adjustment.

The display 730 may include, for example, a liquid crystal display (LCD), a light emitting diode (LED) display, an organic light emitting diode (OLED) display, or an electronic paper display, or the like, but is not limited thereto. The display 730 may display, for example, various contents, e.g., a text, an image, a video, an icon, and/or a symbol, to a user. According to an embodiment, the display 730 may display at least one of the preview image provided from the camera module 710 or the image taken by the camera module 710.

According to an embodiment, the input module 720 may include various input circuitry, such as, for example, and without limitation, a touch screen sensor that receives or senses a user's input. The input module 720 may sense or receive a first input of the user who requests a camera driving operation, an image shooting operation, etc. The input module 720 may sense or receive a second input of the user who sets the region of interest (or the focus position) in the image obtained from the camera module 710.

The memory 740 may, for example, and without limitation, be a volatile memory (e.g., RAM, etc.), a nonvolatile memory (e.g., ROM, flash memory, etc.), or a combination thereof. The memory 740 may store, for example, instructions or data related to at least one other component of the electronic device 70.

According to an embodiment, the memory 740 (e.g., 1450 of FIG. 14) may store the specified point spread function. As an example, the point spread function may include a plurality of point spread degrees modeled to correspond to the defocus size of a point light source (unsaturated) spaced apart from the image sensor 630 by a predetermined distance at each position at which the lens device 610 may move. As another example, the point spread function may include a plurality of point spread degrees modeled based on the design data of the lens device 610 to correspond to the defocus size of the point light source spaced apart by a predetermined distance from the image sensor 630 by a predetermined distance at each position at which the lens device 610 may move.

According to an embodiment, the memory 740 may store instructions to extract areas used for the DFD calculation from the image obtained from the image sensor 630. As an example, the memory 740 may store at least one of the specified movement amount, the first position, or the second position, which is used to control the position by the driver 620. As another example, the memory 740 may store instructions to determine the second partial area of the second image corresponding to the first partial area of the first image.

The processor 750 may include various processing circuitry, such as, for example, and without limitation, at least one of a dedicated processor, a central processing unit (CPU), a graphic processing unit (GPU), a microprocessor, an application processor, an application specific integrated circuit (ASIC), a field programmable gate arrays (FPGA), and/or an image signal processor (ISP), or the like, and include a plurality of cores. The processor 750 may execute a control on at least one other component of the electronic device 70 and/or a calculation related to the communication or a data processing.

According to an embodiment, the processor 750 may obtain the first image with respect to the external object from the image sensor 630 at the first position of the lens device 610. The processor 750 may apply the signal corresponding to the specified movement amount to the driver 620 to move the lens device 610 to the second position from the first position. The processor 750 may obtain the second image corresponding to the second position of the lens device 610 with respect to the external object. The first image and the second image may be, for example, images having a difference in the position of the lens device 610 without having variations in the distance and position of the external object based on the camera module 710. The second image may be, for example, an image taken of the external object that is relatively more zoomed in than the first image.

According to an embodiment, the processor 750 may determine the first partial area (e.g., the region of interest (ROI) area of the first image) corresponding to the specified portion of the external object from the first image. The specified portion may include, for example, at least one of the center area of the first image, the face recognition area of the first image, or the area designated by the user in the first image.

According to an embodiment, the processor 750 may determine the second partial area (e.g., the region of interest (ROI) area of the second image) corresponding to the first partial area and the specified movement amount from the second image. For example, the processor 750 may determine a second distance $R_B$ between the center of the second image and the center of the second partial area by substituting the first distance $R_A$ between the center of the first image and the center of the first partial area, the distance variation coefficient, and the specified movement amount $\delta_{lens}$ into the Equation 3. The distance variation coefficient may be determined through the experiments to identify (determine) how far a predetermined point, which is spaced apart from the center of the image, is from the center of the image along the unit movement of the lens device 610. As another way, the distance variation coefficient may be determined based on the design data of the lens.

According to an embodiment, the processor 750 may determine the center coordinate of the second partial area using the relation between the determined first distance and the calculated second distance. When the determined center coordinate of the second partial area is not an integer number, the processor 750 may determine the center coordinate of the second partial area by rounding off or discarding the decimal point of the determined center coordinate of the second partial area.

According to an embodiment, the processor 750 may detect the second partial area including the first specified number of horizontal pixels and the second specified number of vertical pixels with respect to the center coordinate determined from the second image. The first specified number may correspond to, for example, the number of horizontal pixels of the first partial area. The second specified number may correspond to, for example, the number of vertical pixels of the first partial area. The processor 750 according to an embodiment may correct the coordinate error caused by the viewing angle variation of the lens when detecting the first partial area and the second partial area, and thus the error in the DFD calculation, which caused by the viewing angle variation, may be improved.

According to an embodiment, the processor 750 may correct the average brightness with respect to the determined first partial area and the second partial area. For example, the processor 750 may calculate the average brightness of pixels included in the first partial area and the average brightness of pixels included in the second partial area. The processor 750 may calculate a ratio of the average brightness of the first partial area to the average brightness of the second partial area. The processor 750 may determine a value obtained by multiplying each pixel value of the second partial area by the calculated ratio as a pixel value of the second partial area.

According to an embodiment, the processor 750 may perform the DFD calculation using the first partial area and the second partial area, which have the same or similar average brightness as each other, and thus the error in the result of the DFD calculation, which is caused by the variation of the defocus size due to the brightness difference of the images, may be improved.

According to an embodiment, the processor 750 may determine the first and second images or the first and second partial areas by taking into account a mounting deviation of at least some components of the camera module 710. According to an embodiment, the center of the image plane (e.g., the first image) may be center-shifted from the crossing point between the optical axis of the lens device 610 and the image plane due to the mounting deviation of the camera module 710. In this case, the processor 750 may correct the crossing point between the optical axis of the lens device 610 and the image plane to the center of the first image and determine the first partial area and the second partial area based on the corrected center. According to an embodiment, the optical axis of the lens device 610 may not be vertical to the image plane due to the mounting deviation of the camera module 710. In this case, the processor 750 may determine the first partial area and the second partial area to correct the tilting of the image plane.

According to an embodiment, the processor 750 may determine the focus position with respect to the lens device 610 based on the difference between the first partial area and the second partial area and the specified movement amount. For example, the processor 750 may select plural pairs of two point spread degrees having the distance corresponding to the specified movement amount among the specified point spread degrees from the memory 740 and detect two point spread degrees corresponding to the defocus size of the first and second partial areas among the selected plural pairs of two point spread degrees, thereby determining the focus position of the lens device 610 with respect to the external object.

Figure 8:
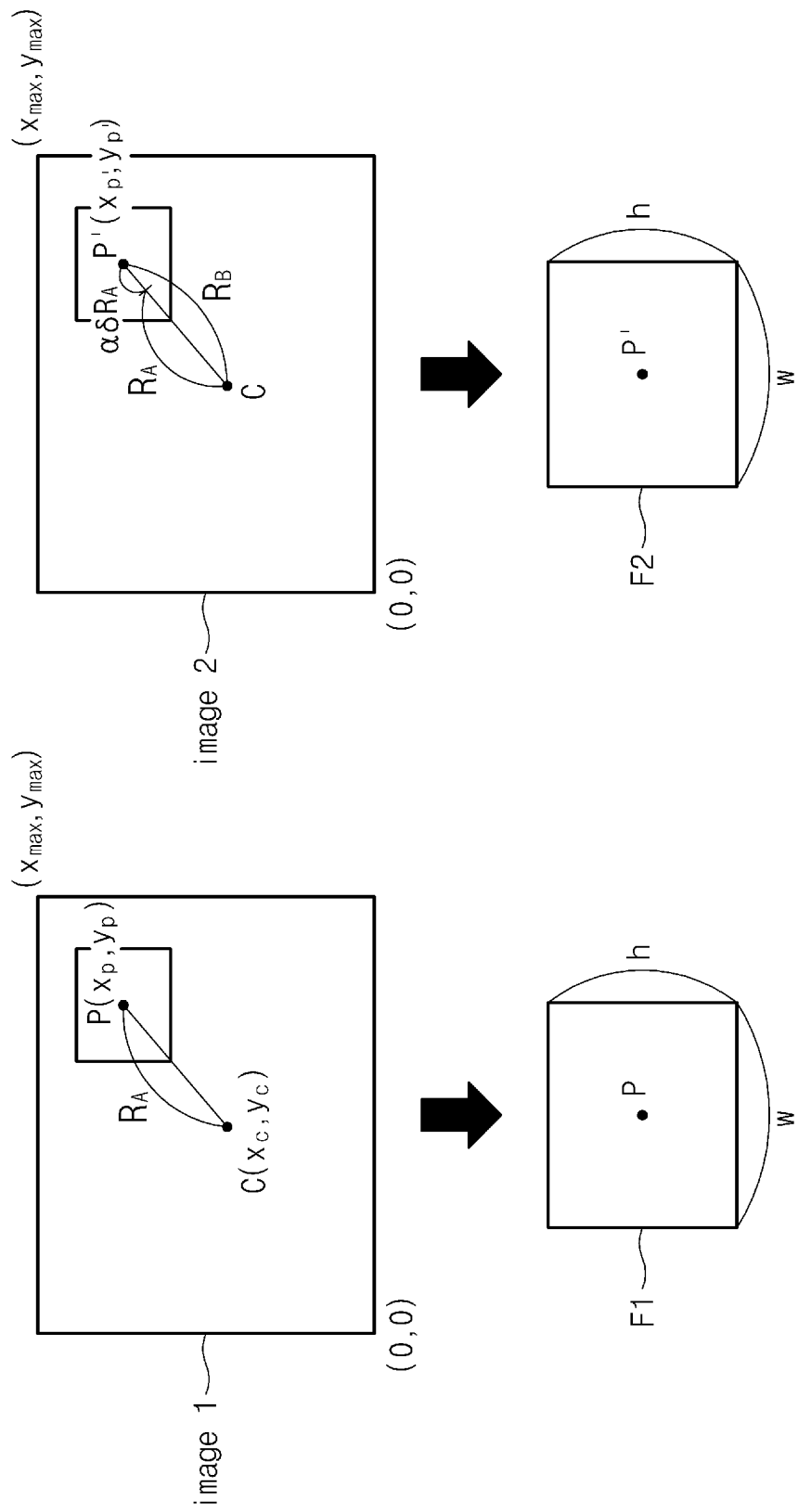
FIG. 8 is a diagram illustrating an example method of determining a second partial area based on a first partial area according to an embodiment.
Figure 9:
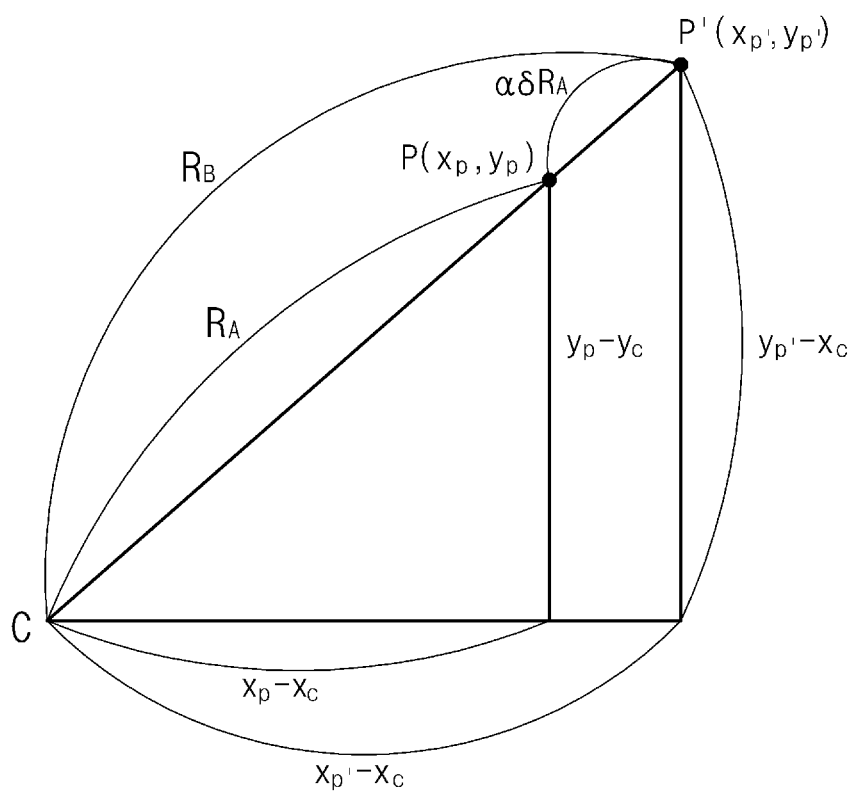
FIG. 9 is a diagram illustrating an example method of determining a position of the second partial area based on a position of the first partial area according to an embodiment.

FIG. 8 is a diagram illustrating an example method of determining the second partial area based on the first partial area according to an embodiment. FIG. 9 is a diagram illustrating an example method of determining the position of the second partial area based on the position of the first partial area according to an embodiment.

In FIG. 8, a case in which the first image, image 1, and the second image, image 2, have a center coordinate C of $(x_c, y_c)$ and include $x_{max}$ horizontal pixels and $y_{max}$ vertical pixels and the first partial area and the second partial area include "a" horizontal pixels and "b" vertical pixels will be described as a representative example. The center coordinate C may be a crossing point where the optical axis crosses the first and second images image 1 and image 2. In FIG. 8, a center coordinate of the first partial area F1, a center coordinate of the second partial area F2, a distance from a center C of the first image to a center P of the first partial area F1, and a distance from the center C of the second image to a center of the second partial area F2 are respectively represented by $(x_p, y_p)$, $(x_p', y_p')$, $R_A$, and $R_B$.

Referring to FIG. 8, according to an embodiment, the processor (e.g., the processor 750 of FIG. 7) may obtain the first image image 1 at the first position of the lens device 610 and obtain the second image image 2 at the second position of the lens device 610 after moving by the specified movement amount.

According to an embodiment, the processor 750 may determine the center C of the designated area of the external object in the first image obtained from the image sensor 630. The processor 750 may detect the area including the "a" horizontal pixels and the "b" vertical pixels designated with respect to the determined center C as the first partial area F1.

According to an embodiment, the processor 750 may determine the first distance $R_A$ between the center of the first image and the center of the first partial area as represented by the following Equation 5.

$$R_A = \sqrt{(x_p - x_c)^2 + (y_p - y_c)^2}$$ Equation 5

According to an embodiment, the processor 750 may determine the second distance $R_B$ between the center of the second image and the second partial area by multiplying the determined first distance by a value, which is obtained after adding the determined distance to a value obtained by multiplying the specified movement amount by the specified distance variation coefficient as represented by the above-mentioned Equation 3.

According to an embodiment, the processor 750 may determine a position coordinates of the second partial area using the determined second distance. As an example, referring to FIG. 9, the processor 750 may determine the center coordinate P' of the second partial area using a trigonometric ratio of a first right triangle with the first distance as its hypotenuse and a second right triangle with the second distance as its hypotenuse. When the determined center coordinate of the second partial area is not an integer number, the processor 750 may determine the center coordinate P' of the second partial area by rounding off or discarding a decimal point of the determined center coordinate of the second partial area.

Referring to FIG. 8 again, according to an embodiment, the processor 750 may detect the second partial area including the "a" horizontal pixels and the "b" vertical pixels with respect to the center coordinate P' determined from the second image.

According to an embodiment, the processor 750 may perform the DFD calculation using the first partial area and the second partial area to determine the focus position of the lens device 610 with respect to the external object.

Figure 10:
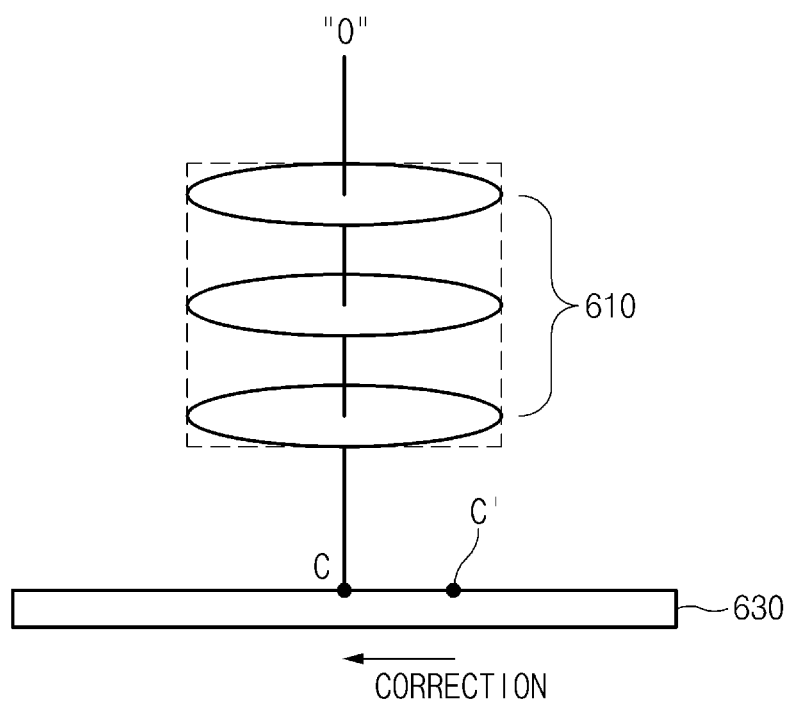
FIG. 10 is a diagram illustrating an example method of correcting an image when a center of the image (image plane) is shifted according to an embodiment.

FIG. 10 is a diagram illustrating an example method of correcting an image when a center of the image (image plane) is shifted according to an embodiment.

Referring to FIG. 10, the center of the image plane may be center-shifted from the crossing point between the optical axis of the lens device 610 and the image plane due to the mounting deviation of the camera module 710. In this case, the processor 750 may correct the center of the image plane to the crossing point C between the optical axis of the lens device 610 and the image plane instead of a physical center C' of the image plane. The processor 750 may determine the region of interest (e.g., the first partial area or the second partial area) based on the corrected center. As an example, the processor 750 may determine the first distance $R_A$ between the corrected center and the center of the first partial area.

Figure 11:
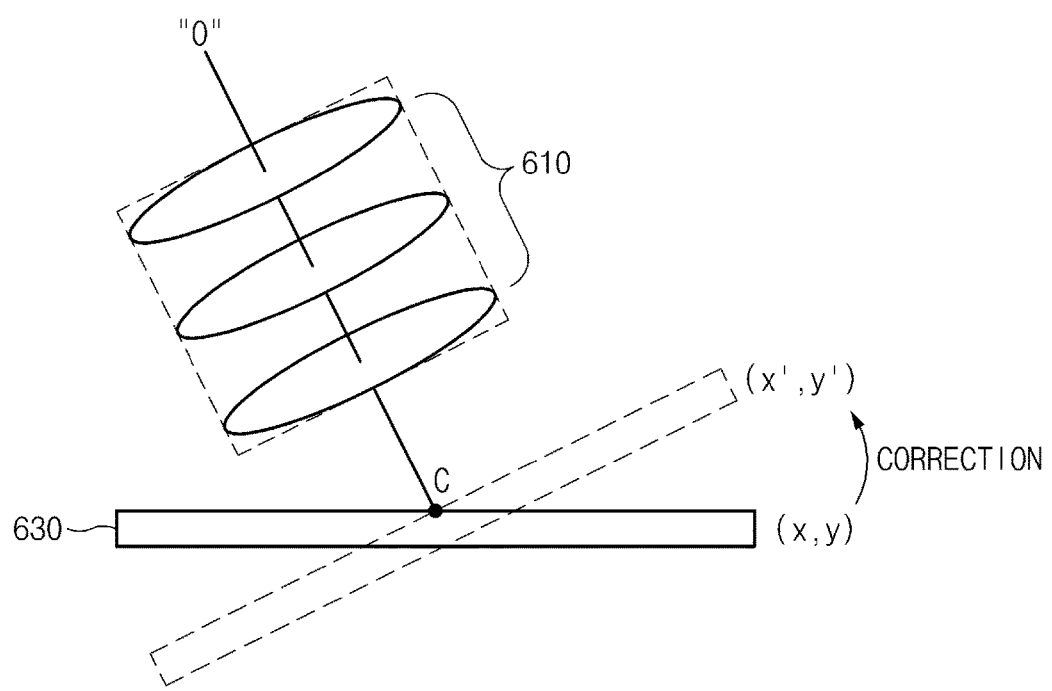
FIG. 11 is a diagram illustrating an example method of correcting an image when the image (image plane) is tilted according to an embodiment.

FIG. 11 is a diagram illustrating an example method of correcting an image when the image (image plane) is tilted according to an embodiment.

Referring to FIG. 11, the optical axis of the lens device 610 may not be vertical to the image plane due to the mounting deviation of the camera module 710. In this case, the image signal processor 640 may determine the first partial area and the second partial area to correct the tilting of the image plane. As an example, when obtaining the image (e.g., the first image or the second image) from the image sensor 630, the image signal processor 640 may correct ((x, y)->(x', y')) the tilting of each pixel of the obtained image using the specified position conversion function and detect the region of interest (e.g., the first partial area or the second partial area) using the corrected image. As an example, the processor 750 may detect the first partial area and the second partial area using the corrected first and second images.

Accord to an embodiment, an electronic device includes a camera (e.g., the camera module 60 of FIG. 6 or the electronic device 70 of FIG. 7), the camera (e.g., the camera module 60 of FIG. 6 or the camera module 710 of FIG. 7) including a lens device (e.g., a lens or the lens device 610 of FIG. 6); and a lens driver (e.g., the driver 620 of FIG. 6) configured to move the lens device, the lens device being provided such that a difference occurs between a first viewing angle when the lens device is located at a first position and a second viewing angle when the lens device is located at a second position or between a first magnification when the lens device is located at the first position and a second magnification when the lens device is located at the second position in at least some sections; and a processor (e.g., the image signal processor 640 of FIG. 6 or the processor 750 of FIG. 7). The processor is configured to cause the electronic device to: obtain a first image from the camera with respect to an external object; move the lens device depending on a specified movement amount using the lens driver; obtain a second image corresponding to a position to which the lens device moves with respect to the external object; determine a first partial area of the first image corresponding to a specified portion of the external object; determine a second partial area of the second image corresponding to the first partial area based on the first partial area and the specified movement amount; determine a focus position with respect to the lens device based on a defocus difference between the first partial area and the second partial area and the specified movement amount; and move the lens device to the focus position using the lens driver.

The processor is configured to cause the electronic device to: determine a position of the second partial area based on a difference in distance between a position of the first partial area and a center position of the first image.

The processor is configured to cause the electronic device to: determine a distance between a center position of the first partial area and the center position of the first image; calculate a distance, which is to be changed depending on the specified movement amount, by multiplying a specified distance variation coefficient, the determined distance, and the specified movement amount by each other, the specified distance variation coefficient being determined based on a distance of a point in the first image other than the center position of the first image from the center position of the first image depending on a unit movement amount set in the lens driver; determine a distance between a center position of the second image and a center of the second partial area by adding the distance, which is to be changed, to the distance between the center of the first partial area and the center position of the first image; and determine a center coordinate of the second partial area using the distance between the center of the second image and the center of the second partial area.

The processor is configured to cause the electronic device to: determine the second partial area including pixels corresponding to a number of pixels included in the first partial area with respect to the determined center coordinate of the second partial area.

The processor is configured to cause the electronic device to, when a center of the first image is shifted from a crossing point between an optical axis of the lens device and the first image: determine a position of the first partial area based on a crossing point between the optical axis and a first surface of the first image; and determine a position of the second partial area based on a crossing point between the optical axis and a first surface of the second image.

The processor is configured to cause the electronic device to, when an optical axis of the lens device is not vertical to the first image: correct the first image such that the first image is vertical to the optical axis; determine the first partial area using the corrected first image; correct the second image such that the second image is vertical to the optical axis; and determine the second partial area using the corrected second image.

The processor is configured to cause the electronic device to determine a position of the second partial area based on a unit movement amount set in the lens driver.

The processor is configured to cause the electronic device to determine a position of the second partial area based on a chance in a distance between a point of the first image except for a center position of the first image and a center of the first image, based on the unit movement amount.

The processor is configured to cause the electronic device to: correct the first partial area or the second partial area based on a difference in brightness between the first partial area and the second partial area; and determine the defocus difference between the first partial area and the second partial area using at least the corrected first partial area or the corrected second partial area.

The processor is configured to cause the electronic device to: determine an average brightness of the first partial area and an average brightness of the second partial; and correct a brightness of the first partial area or a brightness of the second partial area such that a difference between the average brightness of the first partial area and the average brightness of the second partial is within a specified range.

Accord to an embodiment, the electronic device further includes an input module (e.g., the input module 720 of FIG. 7) including various input circuitry to receive or sense a user's input, wherein the processor is configured to determine the specified portion of the external object based on the user's input.

Figure 12:
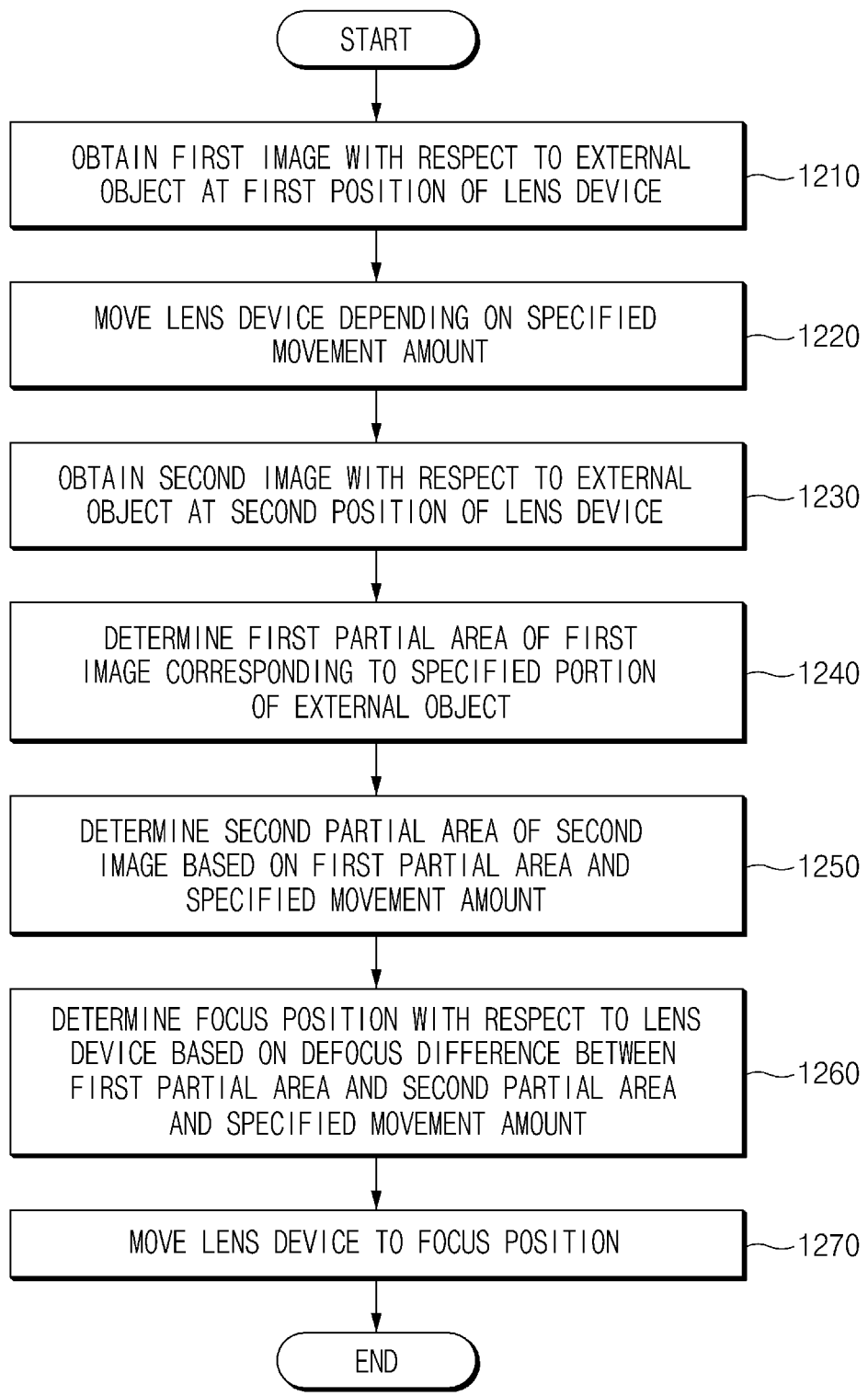
FIG. 12 is a flowchart illustrating an example method of controlling an electronic device that controls a focus of lens according to an embodiment.

FIG. 12 is a flowchart illustrating an example method of controlling an electronic device according to an embodiment.

Referring to FIG. 12, in operation 1210, the processor 750 may obtain the first image with respect to the external object at the first position of the lens device 610. The first position of the lens device 610 may be the specified position. As another example, the first position of the lens device 610 may be a variable position.

In operation 1220, the processor 750 may move the lens device 610 depending on the specified movement amount. As an example, the processor 750 may move the lens device 610 by the specified movement amount. The specified movement amount may be a fixed value or a variable value corresponding to a previous focus position.

In operation 1230, the processor 750 may obtain the second image with respect to the external object at the second position of the lens device 610.

In operation 1240, the processor 750 may determine the first partial area of the first image corresponding to the specified portion of the external object. The specified portion may be, for example, a default portion or a portion set by the user's input. As an example, the processor 750 may determine the range (e.g., the number of horizontal pixels * the number of vertical pixels) of the first partial area such that the specified portion with respect to the external object is located at the center of the first partial area.

In operation 1250, the processor 750 may determine the second partial area of the second image based on the first partial area and the specified movement amount. As an example, the processor 750 may determine the center of the second partial area by substituting a straight line distance between the center of the image plane and the center of the first partial area, the specified movement amount, and the distance variation coefficient based on the unit movement amount into the above-mentioned Equation 3. The processor 750 may determine the second partial area corresponding to the area range of the first partial area with respect to the center of the second partial area.

In operation 1260, the processor 750 may determine the focus position with respect to the lens device 610 based on the defocus difference between the first partial area and the second partial area and the specified movement amount. As an example, the processor 750 may select plural pairs of two point spread degrees having the distance corresponding to the specified movement amount among the specified point spread degrees from the memory 740 and detect two point spread degrees corresponding to the defocus size of the first and second partial areas among the selected plural pairs of two point spread degrees, thereby determining the focus position of the lens device 610 with respect to the external object.

In operation 1270, the processor 750 may move the lens device 610 to the determined focus position. As an example, the processor 750 may determine the movement amount for the lens in order to move the lens device 610 from a present position of the lens device 610 to the determined focus position and may move the lens device 610 by the determined lens movement amount.

In the above-described embodiment, the processor 750 may determine the first partial area and the second partial area using the first image and the second image, each in which the mounting deviation of at least some components of the camera module 710 are corrected. For example, the processor 750 may correct the tilting of the first image and the second image using the specified position conversion function and determine the first partial area and the second partial area using the corrected first and second images. As another example, the processor 750 may determine the positions of the first and second partial images by taking into account the point at which the optical axis vertically crossing the image plane to allow the center shift of the image plane to be corrected.

In the above-mentioned embodiment, the processor 750 may control the average brightness of the first partial area and the average brightness of the second partial area to be same or similar. As an example, the processor 750 may calculate the average brightness of the pixels included in the first partial area and the average brightness of the pixels included in the second partial area and multiply each pixel value of the second partial area by the ratio of the average brightness of the first partial area to the average brightness of the second partial area, thereby adjusting the average brightness of the second partial area to the average brightness of the first partial area. According to an embodiment, the image signal processor 640 may perform the DFD calculation using the first partial area and the second partial area, which have the same or similar average brightness as each other, and thus the error in the result of the DFD calculation, which is caused by the variation of the defocus size due to the brightness difference of the images, may be improved.

According to an embodiment, a method of controlling an electronic device (e.g., the electronic device 70 of FIG. 7) includes a camera (e.g., the camera module 60 of FIG. 6) comprising a lens device (e.g., a lens or the lens device 610 of FIG. 6) and a lens driver (e.g., the driver 620 of FIG. 6) configured to move the lens device, the lens device being provided such that a difference occurs between a first viewing angle when the lens device is located at a first position and a second viewing angle when the lens device is located at a second position or between a first magnification when the lens device is located at the first position and a second magnification when the lens device is located at the second position in at least some sections. The method includes obtaining a first image from the camera with respect to an external object; moving the lens device depending on a specified movement amount using the lens driver; obtaining a second image corresponding to a position to which the lens device moves with respect to the external object; determining a first partial area of the first image corresponding to a specified portion of the external object; determining a second partial area of the second image corresponding to the first partial area based on the first partial area and the specified movement amount; determining a focus position with respect to the lens device based on a defocus difference between the first partial area and the second partial area and the specified movement amount; and moving the lens device to the focus position using the lens driver.

The determining of the second partial area includes determining a position of the second partial area based on a difference in distance between a position of the first partial area and a center position of the first image.

The determining of the position of the second partial area includes determining a distance between a center position of the first partial area and the center position of the first image; calculating a distance, which is to be changed depending on the specified movement amount, by multiplying a specified distance variation coefficient, the determined distance, and the specified movement amount by each other, the specified distance variation coefficient being determined based on a distance of a point in the first image except for the center position of the first image from the center position of the first image depending on a unit movement amount set in the lens driver; determining a distance between a center position of the second image and a center of the second partial area by adding the distance, which is to be changed, to the difference in distance; and determining a center coordinate of the second partial area using the distance between the center position of the second image and the center of the second partial area.

The determining of the position of the second partial area includes determining the second partial area including pixels corresponding to a number of pixels included in the first partial area with respect to the determined center coordinate of the second partial area.

The determining of the second partial area further includes, when a center of the first image is shifted from a crossing point between an optical axis of the lens device and the first image: determining a crossing point between the optical axis and a first surface of the first image as the center position of the first image; and determining a difference between the position of the first partial area and the center position of the first image.

The method further includes correcting the first image such that the first image is vertical to an optical axis; and correcting the second image such that the second image is vertical to the optical axis when the optical axis is not vertical to the first image and the second image.

The method further includes correcting the first partial area or the second partial area based on a difference in brightness between the first partial area and the second partial area, wherein the determining of the focus position includes determining the defocus difference between the first partial area and the second partial area using the corrected first partial area or the corrected second partial area.

The correcting of the second partial area includes calculating an average brightness of the first partial area and an average brightness of the second partial; and correcting a brightness of the first partial area or a brightness of the second partial area such that a difference between the average brightness of the first partial area and the average brightness of the second partial is within a specified range.

The method further includes receiving or sensing a user's input, wherein the determining of the first partial area includes determining the specified portion of the external object based on the user's input.

Figure 13:
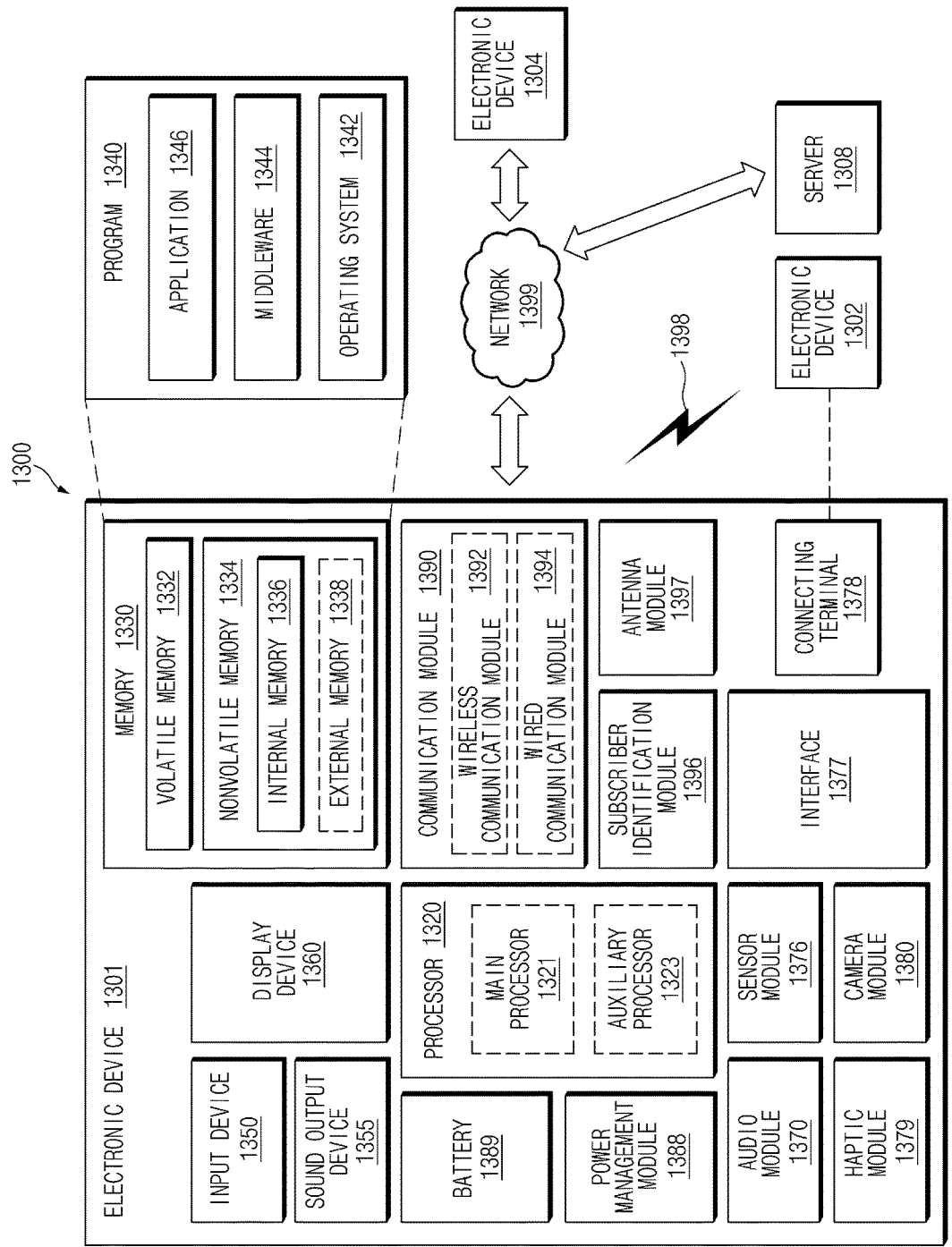
FIG. 13 is a block diagram illustrating an electronic device that controls a focus of lens in a network environment according to various embodiments.

FIG. 13 is a block diagram illustrating an electronic device 1301 in a network environment 1300 according to various embodiments. Referring to FIG. 13, the electronic device 1301 (e.g., the electronic device 70 of FIG. 7) may communicate with an electronic device 1302 through a first network 1398 (e.g., a short-range wireless communication) or may communicate with an electronic device 1304 or a server 1308 through a second network 1399 (e.g., a long-distance wireless communication) in the network environment 1300. According to an embodiment, the electronic device 1301 may communicate with the electronic device 1304 through the server 1308. According to an embodiment, the electronic device 1301 may include a processor (e.g., including processing circuitry) 1320 (e.g., the processor 750 of FIG. 7), a memory 1330 (e.g., the memory 740 of FIG. 7), an input device (e.g., including input circuitry) 1350 (e.g., the input module 710 of FIG. 7), a sound output device (e.g., including sound output circuitry) 1355, a display device (e.g., including a display) 1360, an audio module (e.g., including audio circuitry) 1370, a sensor module 1376, an interface (e.g., including interface circuitry) 1377, a haptic module (e.g., including haptic circuitry) 1379, a camera module (e.g., including a camera) 1380 (e.g., the camera module 710 of FIG. 7), a power management module 1388, a battery 1389, a communication module (e.g., including communication circuitry) 1390, a subscriber identification module 1396, and an antenna module 1397. According to some embodiments, at least one (e.g., the display device 1360 or the camera module 1380) among components of the electronic device 1301 may be omitted or other components may be added to the electronic device 1301. According to some embodiments, some components may be integrated and implemented as in the case of the sensor module 1376 (e.g., a fingerprint sensor, an iris sensor, or an illuminance sensor) embedded in the display device 1360 (e.g., a display 730 of FIG. 7).

The processor 1320 may include various processing circuitry and operate, for example, software (e.g., a program 1340) to control at least one of other components (e.g., a hardware or software element) of the electronic device 1301 connected to the processor 1320 and may process and compute a variety of data. The processor 1320 may load a command set or data, which is received from other components (e.g., the sensor module 1376 or the communication module 1390), into a volatile memory 1332, may process the loaded command or data, and may store result data into a nonvolatile memory 1334. According to an embodiment, the processor 1320 may include various processing circuitry, such as, for example, and without limitation, a main processor 1321 (e.g., a central processing unit or an application processor) and a co-processor 1323 (e.g., a graphic processing device, an image signal processor, a sensor hub processor, or a communication processor), or the like, which operates independently from the main processor 1321, additionally or alternatively uses less power than the main processor 1321, or is specified to a designated function. In this case, the coprocessor 1323 may operate separately from the main processor 1321 or embedded.

In this case, the coprocessor 1323 may control, for example, at least some of functions or states associated with at least one component (e.g., the display device 1360, the sensor module 1376, or the communication module 1390) among the components of the electronic device 1301 instead of the main processor 1321 while the main processor 1321 is in an inactive (e.g., sleep) state or together with the main processor 1321 while the main processor 1321 is in an active (e.g., an application execution) state. According to an embodiment, the coprocessor 1323 (e.g., the image signal processor or the communication processor) may be implemented as a part of another component (e.g., the camera module 1380 or the communication module 1390) that is functionally related to the coprocessor 1323. The memory 1330 may store a variety of data used by at least one component (e.g., the processor 1320 or the sensor module 1376) of the electronic device 1301, for example, software (e.g., the program 1340) and input data or output data with respect to commands associated with the software. The memory 1330 may include the volatile memory 1332 or the nonvolatile memory 1334.

The program 1340 may be stored in the memory 1330 as software and may include, for example, an operating system 1342, a middleware 1344, and/or an application 1346.

The input device 1350 may be a device for receiving a command or data, which is used for a component (e.g., the processor 1320) of the electronic device 1301, from an outside (e.g., a user) of the electronic device 1301 and may include various input circuitry, such as, for example, and without limitation, a microphone, a mouse, and/or a keyboard, or the like.

The sound output device 1355 may be a device for outputting a sound signal to the outside of the electronic device 1301 and may include various sound output circuitry, such as, for example, and without limitation, a speaker used for general purposes, such as multimedia play or recordings play, and a receiver used only for receiving calls. According to an embodiment, the receiver and the speaker may be either integrally or separately implemented.

The display device 1360 may include a display and be a device for visually presenting information to the user and may include, for example, a display, a hologram device, or a projector and a control circuit for controlling a corresponding device. According to an embodiment, the display device 1360 may include a touch circuitry or a pressure sensor for measuring an intensity of pressure on the touch.

The audio module 1370 may include various audio circuitry and convert a sound and an electrical signal in dual directions. According to an embodiment, the audio module 1370 may obtain the sound through the input device 1350 or may output the sound through an external electronic device (e.g., the electronic device 1302 (e.g., a speaker or a headphone)) wired or wirelessly connected to the sound output device 1355 or the electronic device 1301.

The sensor module 1376 may generate an electrical signal or a data value corresponding to an operating state (e.g., power or temperature) inside or an environmental state outside the electronic device 1301. The sensor module 1376 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1377 may support a designated protocol wired or wirelessly connected to the external electronic device (e.g., the electronic device 1302). According to an embodiment, the interface 1377 may include various interface circuitry, such as, for example, and without limitation, an HDMI (high-definition multimedia interface), a USB (universal serial bus) interface, an SD card interface, and/or an audio interface, or the like.

A connection terminal 1378 may include a connector that physically connects the electronic device 1301 to the external electronic device (e.g., the electronic device 1302), for example, an HDMI connector, a USB connector, an SD card connector, or an audio connector (e.g., a headphone connector).

The haptic module 1379 may convert an electrical signal to a mechanical stimulation (e.g., vibration or movement) or an electrical stimulation perceived by the user through tactile or kinesthetic sensations. The haptic module 1379 may include various haptic circuitry, such as, for example, and without limitation, a motor, a piezoelectric device, and/or an electric stimulator, or the like.

The camera module 1380 may include a camera and shoot a still image or a video image. According to an embodiment, the camera module 1380 may include, for example, at least one lens, an image sensor, an image signal processor, or a flash.

The power management module 1388 may be a module for managing power supplied to the electronic device 1301 and may serve as at least a part of a power management integrated circuit (PMIC).

The battery 1389 may be a device for supplying power to at least one component of the electronic device 1301 and may include, for example, a non-rechargeable (primary) battery, a rechargeable (secondary) battery, or a fuel cell.

The communication module 1390 may establish a wired or wireless communication channel between the electronic device 1301 and the external electronic device (e.g., the electronic device 1302, the electronic device 1304, or the server 1308) and support communication execution through the established communication channel. The communication module 1390 may include various communication circuitry included in various communication chips and at least one communication processor operating independently from the processor 1320 (e.g., the application processor) and supporting the wired communication or the wireless communication. According to an embodiment, the communication module 1390 may include various communication circuitry included in various communication modules, such as, for example, and without limitation, a wireless communication module 1392 (e.g., a cellular communication module, a short-range wireless communication module, and/or a GNSS (global navigation satellite system) communication module), or the like, and/or a wired communication module 1394 (e.g., an LAN (local area network) communication module or a power line communication module) and may communicate with the external electronic device using a corresponding communication module among them through the first network 1398 (e.g., the short-range communication network such as a Bluetooth, a WiFi direct, or an IrDA (infrared data association)) or the second network 1399 (e.g., the long-distance wireless communication network such as a cellular network, an internet, or a computer network (e.g., LAN or WAN)). The above-mentioned various communication modules 1390 may be implemented into one chip or into separate chips, respectively.

According to an embodiment, the wireless communication module 1392 may identify and authenticate the electronic device 1301 using user information stored in the subscriber identification module 1396 in the communication network.

The antenna module 1397 may include one or more antennas to transmit or receive the signal or power to or from an external source. According to an embodiment, the communication module 1390 (e.g., the wireless communication module 1392) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1301 and the external electronic device 1304 through the server 1308 connected to the second network 1399. Each of the electronic devices 1302 and 1304 may be the same or different types as or from the electronic device 1301. According to an embodiment, all or some of the operations performed by the electronic device 1301 may be performed by another electronic device or a plurality of external electronic devices. When the electronic device 1301 performs some functions or services automatically or by request, the electronic device 1301 may request the external electronic device to perform at least some of the functions related to the functions or services, in addition to or instead of performing the functions or services by itself. The external electronic device receiving the request may carry out the requested function or the additional function and transmit the result to the electronic device 1301. The electronic device 1301 may provide the requested functions or services based on the received result as is or after additionally processing the received result. To this end, for example, a cloud computing, distributed computing, or client-server computing technology may be used.

Figure 14:
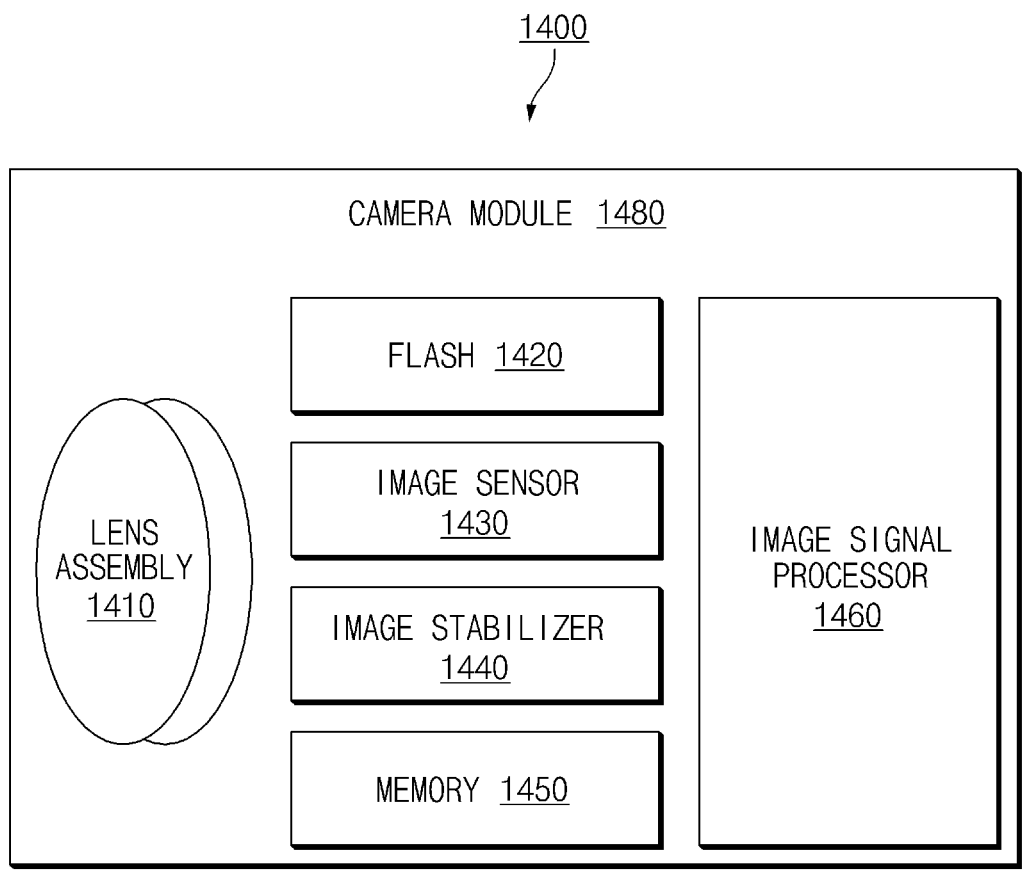
FIG. 14 is a block diagram illustrating a camera module that controls a focus of lens according to various embodiments.

FIG. 14 is a block diagram 1400 illustrating a camera module 1380 according to various embodiments. Referring to FIG. 14, the camera module 1380 (e.g., the camera module 60 of FIG. 6) may include a lens assembly (e.g., including a lens) 1410 (e.g., the lens device 610 of FIG. 6), a flash 1420, an image sensor 1430 (e.g., the image sensor 630 of FIG. 6), an image stabilizer (e.g., including image stabilizing circuitry) 1440 (e.g., the driver 620 of FIG. 6), a memory 1450 (e.g., a buffer memory) (e.g., the memory 650 of FIG. 6), and an image signal processor (e.g., including image processing circuitry) 1460 (e.g., the image signal processor 640 of FIG. 6). The lens assembly 1410 may collect a light emitted from an external object for image-capturing. The lens assembly 1410 may include one or more lenses. According to an embodiment, the camera module 1380 may include a plurality of lens assemblies 1410. According to an embodiment, the camera module 1380 may be, for example, a dual camera, a 360-degree camera, or a spherical camera. The lens assemblies 1410 may have the same lens properties (e.g., a viewing angle, a focal length, an auto-focus function, an f number, or an optical zoom function), or at least one lens assembly may have at least one different lens property from that of other lens assemblies. The lens assembly 1410 may include, for example, a wide-angle lens or a telephoto lens. The flash 1420 may emit a light used to enhance the light emitted from the external object. The flash 1420 may include one or more light emitting diodes (e.g., an RGB (red-green-blue) LED, a white LED, an infrared LED, or an ultraviolet LED) or a xenon lamp.

The image sensor 1430 may convert the light, which is applied thereto through the lens assembly 1410 from the external object, to an electrical signal to obtain the image corresponding to the external object. According to an embodiment, the image sensor 1430 may include, for example, one image sensor selected from among image sensors having different properties, e.g., an RGB sensor, a black and white (BW) sensor, an IR sensor, an UV sensor, or the like, a plurality of image sensors having the same property, or a plurality of image sensors having the different properties from each other. Each image sensor included in the image sensor 1430 may be implemented in, for example, and without limitation, a charged coupled device (CCD) sensor, a complementary metal oxide semiconductor (CMOS) sensor, or the like.

Responsive to a movement of the camera module 1380 or the electronic device 1301 including the camera module 1380, the image stabilizer 1440 may include various image stabilizing circuitry and move or control (e.g., control a read-out timing) at least one lens included in the lens assembly 1410 or the image sensor 1430 in a specific direction to compensate for at least a portion of a negative influence, which is caused by the movement, on the image to be taken. According to an embodiment, the image stabilizer 1440 may be implemented in, for example, an optical-type image stabilizer, and the movement may be sensed by a gyro sensor (not shown) or an acceleration sensor (not shown) located inside or outside the camera module 1380.

The memory 1450 may temporarily store at least a portion of the image obtained through the image sensor 1430 for a next image processing operation. As an example, when an image obtaining operation using a shutter is delayed or a plurality of images is obtained at high speed, the obtained original image (e.g., an image with high resolution) may be stored in the memory 1450, and a copy image (e.g., an image with low resolution) of the obtained image may be previewed through the display device 1360. Then, when a specified condition (e.g., a user's input or a system command) is satisfied, at least a portion of the original image stored in the memory 1450 may be processed by the image signal processor 1460. According to an embodiment, the memory 1450 may be implemented in at least a portion of the memory 1330 or a separate memory independently operated from the memory 1330.

The image signal processor 1460 may include various image signal processing circuitry and perform an image processing operation (e.g., a depth map generating operation, a three-dimensional modeling operation, a panorama generating operation, a feature point extracting operation, an image synthesizing operation, or an image compensating operation (e.g., noise reduction, resolution control, brightness control, blurring, sharpening, or softening)) on the image obtained through the image sensor 1430 or the image stored in the memory 1450. Additionally or alternatively, the image signal processor 1460 may perform a control operation (e.g., an exposure time control, a read-out timing control, etc.) on at least one component (e.g., the image sensor 1430) among components included in the camera module 1380. The image processed by the image signal processor 1460 may be stored again into the memory 1450 to further process the image or transmitted to external components (e.g., the memory 1330, the display device 1360, the electronic device 1302, the electronic device 1304, or the server 1308) of the camera module 1380. According to an embodiment, the image signal processor 1460 may be implemented in at least a portion of the processor 1320 or a separate processor independently operated from the processor 1320. When the image signal processor 1460 is implemented in the separate processor, the images processed by the image signal processor 1460 may be displayed through the display device 1360 without being further processed or after being further processed by the processor 1320.

According to an embodiment, the electronic device 1301 may include two or more camera modules 1380 having different properties or functions from each other. In this case, at least one camera module 1380 may be a wide-angle camera or a front-facing camera, and at least one other camera module may be a telephoto camera or a rear-facing camera.

The term "module" as used in the present disclosure may refer, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, without limitation, at least one of a dedicated processor, a CPU, an application-specific IC (ASIC) chip, a field-programmable gate array (FPGA), and/or a programmable-logic device, or the like, for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 1320, may cause the one or more processors to perform a function corresponding to the instruction. The computer-readable storage media, for example, may be the memory 1330.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
   a camera, the camera including:
      a lens device comprising at least one lens; and
      a lens driver comprising lens driving circuitry configured to move the lens device, the lens device being configured such that a difference occurs between a first viewing angle when the lens device is located at a first position and a second viewing angle when the lens device is located at a second position and/or a difference occurs between a first magnification when the lens device is located at the first position and a second magnification when the lens device is located at the second position in at least some sections; and
   a processor configured to cause the electronic device to:
      obtain a first image from the camera with respect to an external object;
      move the lens device depending on a specified amount of movement using the lens driver;
      obtain a second image corresponding to a position to which the lens device moves with respect to the external object;

determine a first partial area of the first image corresponding to a specified portion of the external object;
determine a second partial area of the second image corresponding to the first partial area based on the first partial area and the specified amount of movement;
determine a focus position with respect to the lens device based on a defocus difference between the first partial area and the second partial area and the specified amount of movement; and
move the lens device to the focus position using the lens driver.

2. The electronic device of claim 1, wherein the processor is configured to cause the electronic device to: determine a position of the second partial area based on a difference in distance between a position of the first partial area and a center position of the first image.

3. The electronic device of claim 2, wherein the processor is configured to cause the electronic device to:
determine a distance between a center position of the first partial area and the center position of the first image;
determine a distance, which is to be changed depending on the specified amount of movement, by multiplying a specified distance variation coefficient, the determined distance, and the specified amount of movement by each other, the specified distance variation coefficient being determined based on a distance of a point in the first image other than the center position of the first image from the center position of the first image depending on a unit movement amount set in the lens driver;
determine a distance between a center position of the second image and a center of the second partial area by adding the distance, which is to be changed, to the distance between the center of the first partial area and the center position of the first image; and
determine a center coordinate of the second partial area using the distance between the center of the second image and the center of the second partial area.

4. The electronic device of claim 3, wherein the processor is configured to cause the electronic device to determine the second partial area including pixels corresponding to a number of pixels included in the first partial area with respect to the determined center coordinate of the second partial area.

5. The electronic device of claim 1, wherein the processor is configured to cause the electronic device to, when a center of the first image is shifted from a crossing point between an optical axis of the lens device and the first image:
determine a position of the first partial area based on a crossing point between the optical axis and a first surface of the first image; and
determine a position of the second partial area based on a crossing point between the optical axis and a first surface of the second image.

6. The electronic device of claim 1, wherein the processor is configured to cause the electronic device to, when an optical axis of the lens device is not vertical to the first image:
correct the first image such that the first image is vertical to the optical axis;
determine the first partial area using the corrected first image;
correct the second image such that the second image is vertical to the optical axis; and
determine the second partial area using the corrected second image.

7. The electronic device of claim 1, wherein the processor is configured to cause the electronic device to determine a position of the second partial area based on a unit movement amount set in the lens driver.

8. The electronic device of claim 7, wherein the processor is configured to cause the electronic device to determine a position of the second partial area based on a change in a distance between a point of the first image other than a center position of the first image and a center of the first image, based on the unit movement amount.

9. The electronic device of claim 1, wherein the processor is configured to cause the electronic device to:
correct the first partial area or the second partial area based on a difference in brightness between the first partial area and the second partial area; and
determine the defocus difference between the first partial area and the second partial area using at least the corrected first partial area or the corrected second partial area.

10. The electronic device of claim 9, wherein the processor is configured to cause the electronic device to:
determine an average brightness of the first partial area and an average brightness of the second partial area; and
correct a brightness of the first partial area or a brightness of the second partial area such that a difference between the average brightness of the first partial area and the average brightness of the second partial is within a specified range.

11. The electronic device of claim 1, further comprising an input module comprising input circuitry configured to receive and/or sense an input, wherein the processor is configured to determine the specified portion of the external object based on the received and/or sensed input.

12. A method of controlling an electronic device comprising a camera comprising a lens device including at least one lens and a lens driver comprising lens driving circuitry configured to move the lens device, the lens device being configured such that a difference occurs between a first viewing angle when the lens device is located at a first position and a second viewing angle when the lens device is located at a second position and/or a difference occurs between a first magnification when the lens device is located at the first position and a second magnification when the lens device is located at the second position in at least some sections, the method comprising:
obtaining a first image from the camera with respect to an external object;
moving the lens device depending on a specified amount of movement using the lens driver;
obtaining a second image corresponding to a position to which the lens device moves with respect to the external object;
determining a first partial area of the first image corresponding to a specified portion of the external object;
determining a second partial area of the second image corresponding to the first partial area based on the first partial area and the specified amount of movement;
determining a focus position with respect to the lens device based on a defocus difference between the first partial area and the second partial area and the specified amount of movement; and
moving the lens device to the focus position using the lens driver.

13. The method of claim 12 wherein the determining of the second partial area includes determining a position of the second partial area based on a difference in distance between a position of the first partial area and a center position of the first image.

14. The method of claim 13, wherein the determining of the position of the second partial area includes:
    determining a distance between a center position of the first partial area and the center position of the first image;
    determining a distance, which is to be changed depending on the specified amount of movement, by multiplying a specified distance variation coefficient, the determined distance, and the specified amount of movement by each other, the specified distance variation coefficient being determined based on a distance of a point in the first image other than the center position of the first image from the center position of the first image depending on a unit movement amount set in the lens driver;
    determining a distance between a center position of the second image and a center of the second partial area by adding the distance, which is to be changed, to the difference in distance; and
    determining a center coordinate of the second partial area using the distance between the center position of the second image and the center of the second partial area.

15. The method of claim 14, wherein the determining of the position of the second partial area includes determining the second partial area including pixels corresponding to a number of pixels included in the first partial area with respect to the determined center coordinate of the second partial area.

16. The method of claim 13, wherein the determining of the second partial area further includes, when a center of the first image is shifted from a crossing point between an optical axis of the lens device and the first image:
    determining a crossing point between the optical axis and a first surface of the first image as the center position of the first image; and
    determining a difference between the position of the first partial area and the center position of the first image.

17. The method of claim 12, further comprising:
    correcting the first image such that the first image is vertical to an optical axis; and
    correcting the second image such that the second image is vertical to the optical axis when the optical axis is not vertical to the first image and the second image.

18. The method of claim 12, further comprising correcting the first partial area or the second partial area based on a difference in brightness between the first partial area and the second partial area, wherein the determining of the focus position includes determining the defocus difference between the first partial area and the second partial area using the corrected first partial area or the corrected second partial area.

19. The method of claim 18, wherein the correcting of the second partial area includes:
    determining an average brightness of the first partial area and an average brightness of the second partial area; and
    correcting a brightness of the first partial area or a brightness of the second partial area such that a difference between the average brightness of the first partial area and the average brightness of the second partial is within a specified range.

20. The electronic device of claim 12, further comprising receiving and/or sensing an input, wherein the determining of the first partial area includes determining the specified portion of the external object based on the received and/or sensed input.

* * * * *